(12) United States Patent
Pfeiffer et al.

(10) Patent No.: US 6,364,030 B1
(45) Date of Patent: Apr. 2, 2002

(54) TEETH ARRANGEMENT FOR BLADE DISKS

(75) Inventors: Mark R. Pfeiffer, Warminster; Michael J. MacIntyre, Hatboro, both of PA (US)

(73) Assignee: Schiller-Pfeiffer, Inc., Southhampton, PA (US)

( * ) Notice: Subject to any disclaimer, the term of this patent is extended or adjusted under 35 U.S.C. 154(b) by 0 days.

(21) Appl. No.: 09/618,699

(22) Filed: Jul. 18, 2000

Related U.S. Application Data

(60) Provisional application No. 60/144,720, filed on Jul. 20, 1999.

(51) Int. Cl.$^7$ ............................................... A01B 21/02
(52) U.S. Cl. ..................................... 172/555; 172/540
(58) Field of Search ................................ 172/555, 540, 172/556, 604, 349, 123, 42; 56/255, 295

(56) References Cited

U.S. PATENT DOCUMENTS

| | | |
|---|---|---|
| 1,122,461 A | 12/1914 | Arundel |
| 2,352,127 A | 6/1944 | Sheldon |
| 2,558,822 A | 7/1951 | Claus |
| 3,783,952 A | 1/1974 | Van Gemert |
| 4,817,732 A | 4/1989 | Brown |
| 5,299,647 A | 4/1994 | Mudd et al. |

FOREIGN PATENT DOCUMENTS

| | | |
|---|---|---|
| FR | 2 558 330 | 7/1985 |
| FR | 2 689 363 | 10/1993 |
| GB | 714394 | 8/1954 |
| GB | 2 079 121 A | 1/1982 |
| WO | 88 03746 A | 6/1988 |

*Primary Examiner*—Robert E. Pezzuto
(74) *Attorney, Agent, or Firm*—Akin, Gump, Strauss, Hauer & Feld, L.L.P.

(57) ABSTRACT

A blade assembly for use with a tilling mechanism including a first blade disk. A second blade disk is coaxially mounted to rotate with the first blade disk and is positioned in a spaced apart generally parallel fashion relative to the first blade disk. The first blade disk and the second blade disk are rotatable in a first direction. A first plurality of teeth are disposed on the first blade disk. Each of the first plurality of teeth have a first leading edge which extends generally radially outwardly from the first blade disk. A second plurality of teeth are disposed on the second blade disk. Each of the second plurality of teeth has a second leading edge which extends generally linearly outwardly from the second blade disk in a direction counter to the first direction. The second leading edge forms an obtuse angle as measured relative to a line extending in the first direction tangent to the second blade disk. A second embodiment of the blade assembly is also shown herein.

11 Claims, 18 Drawing Sheets

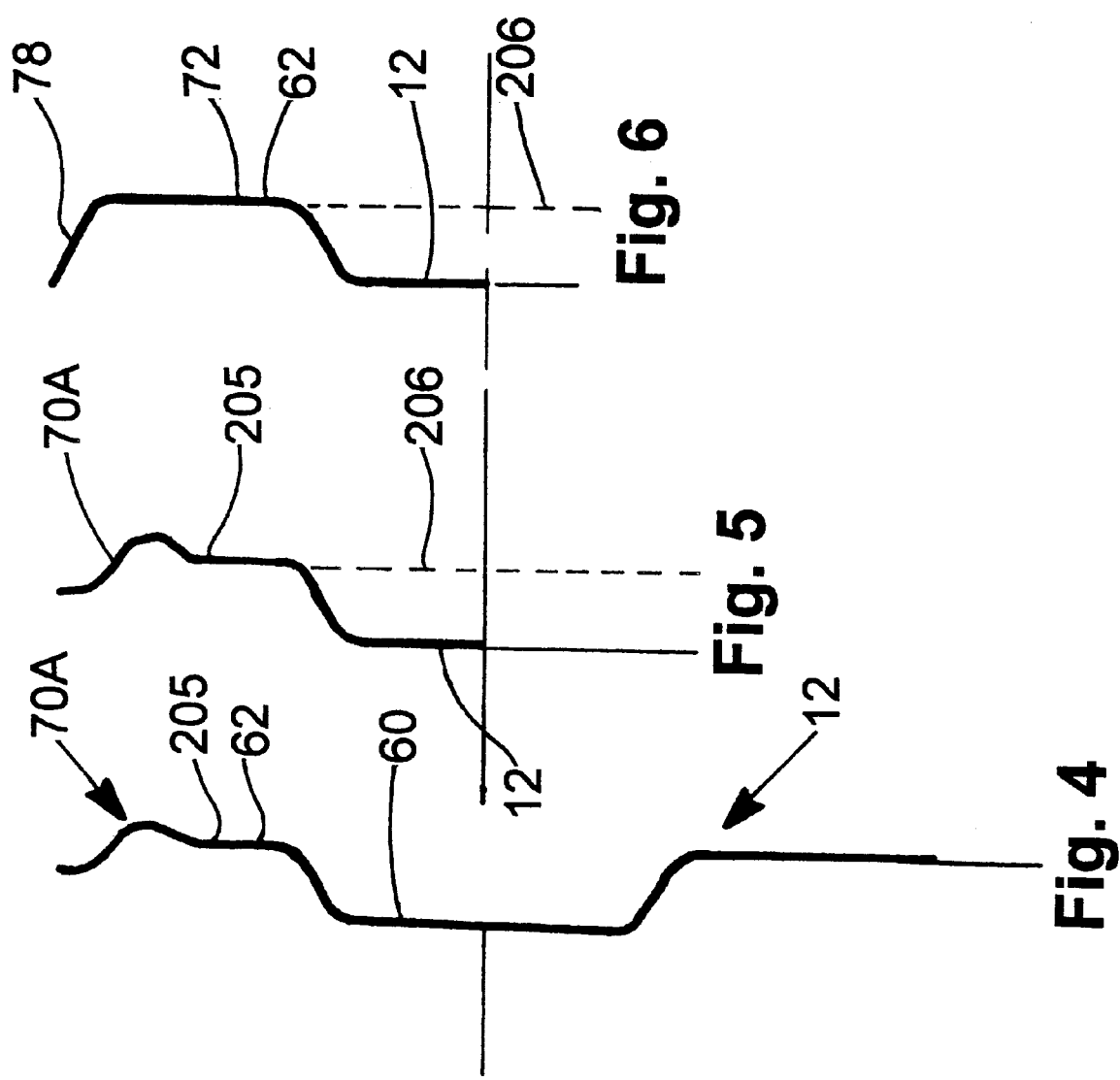

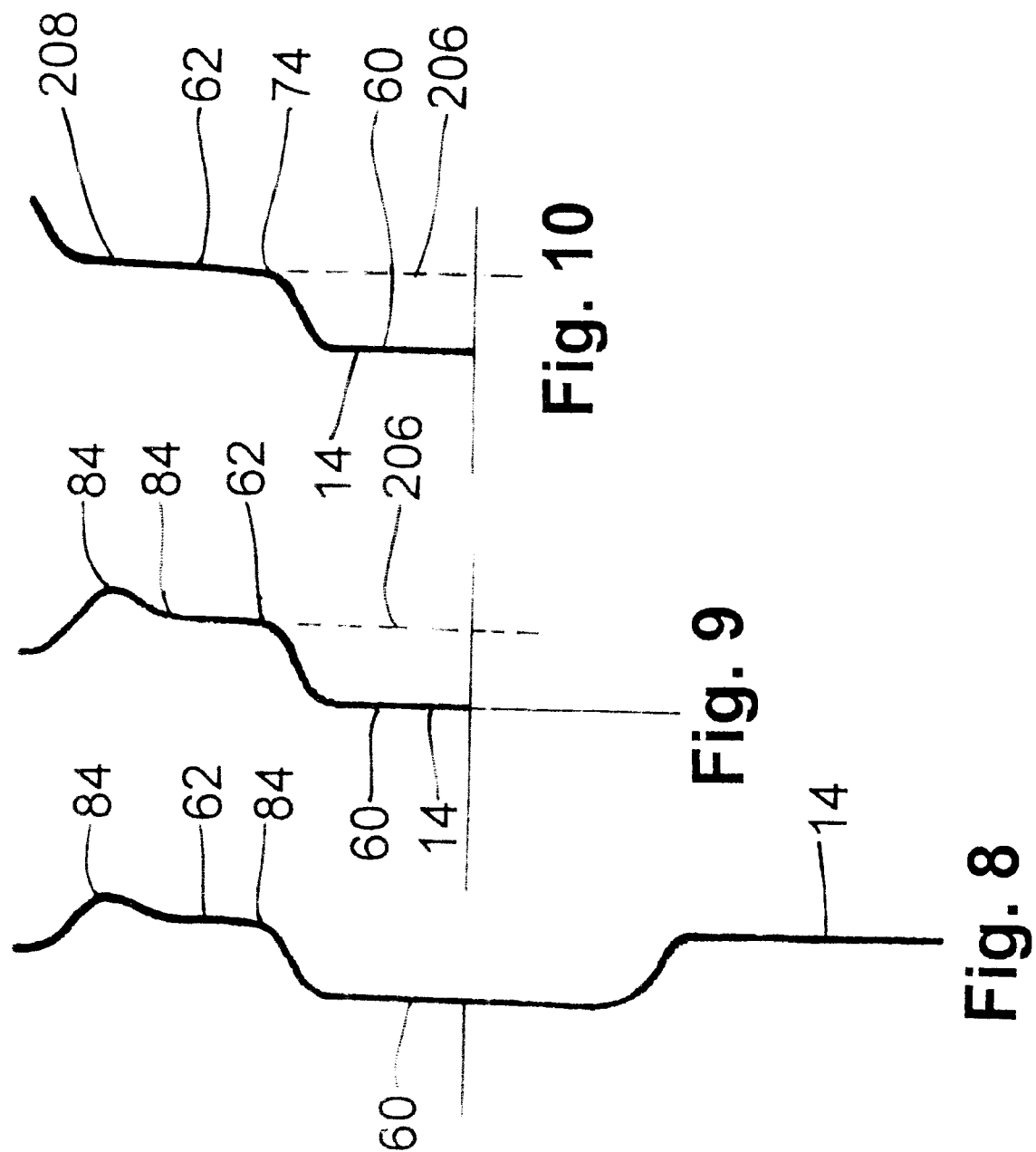

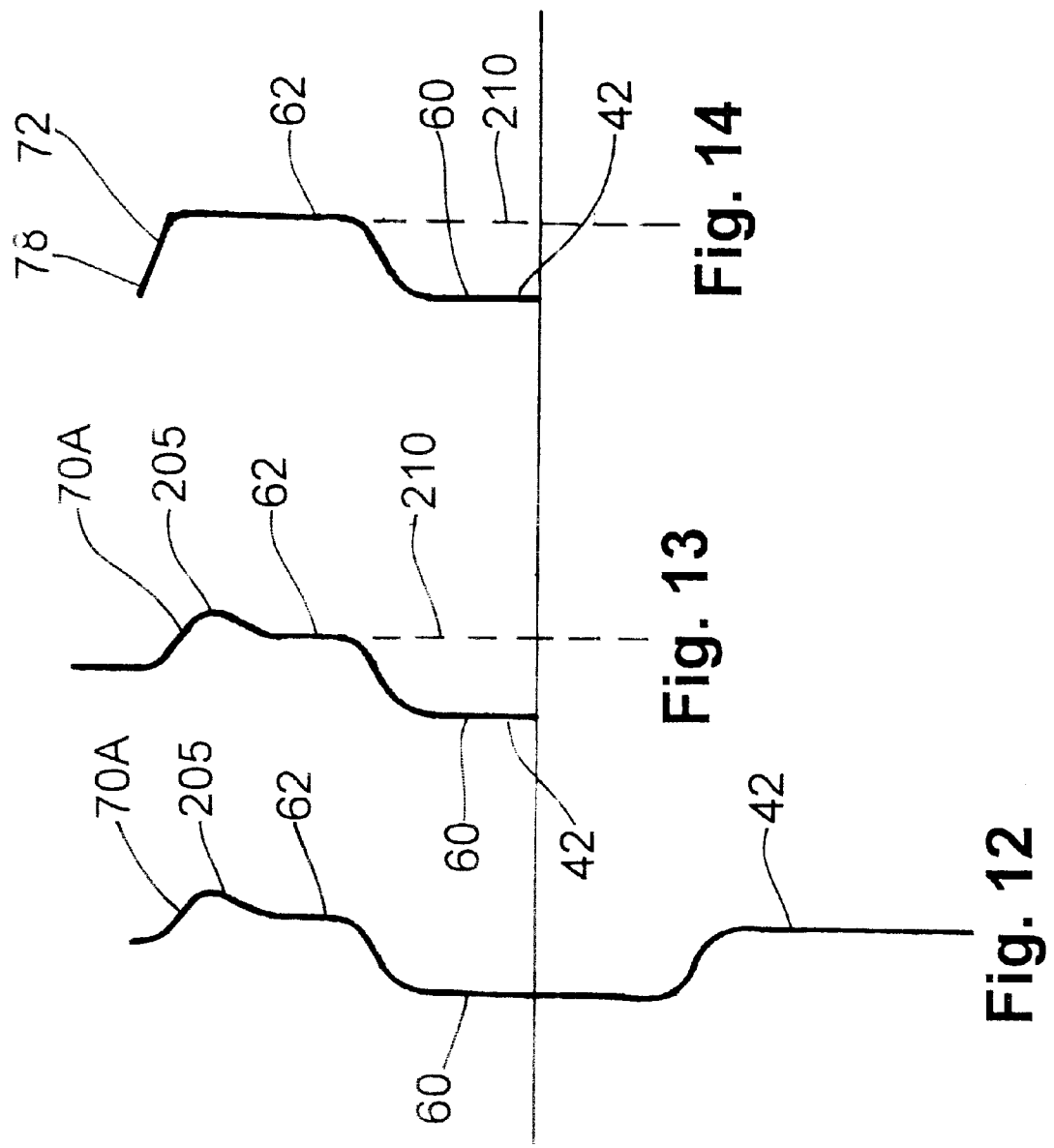

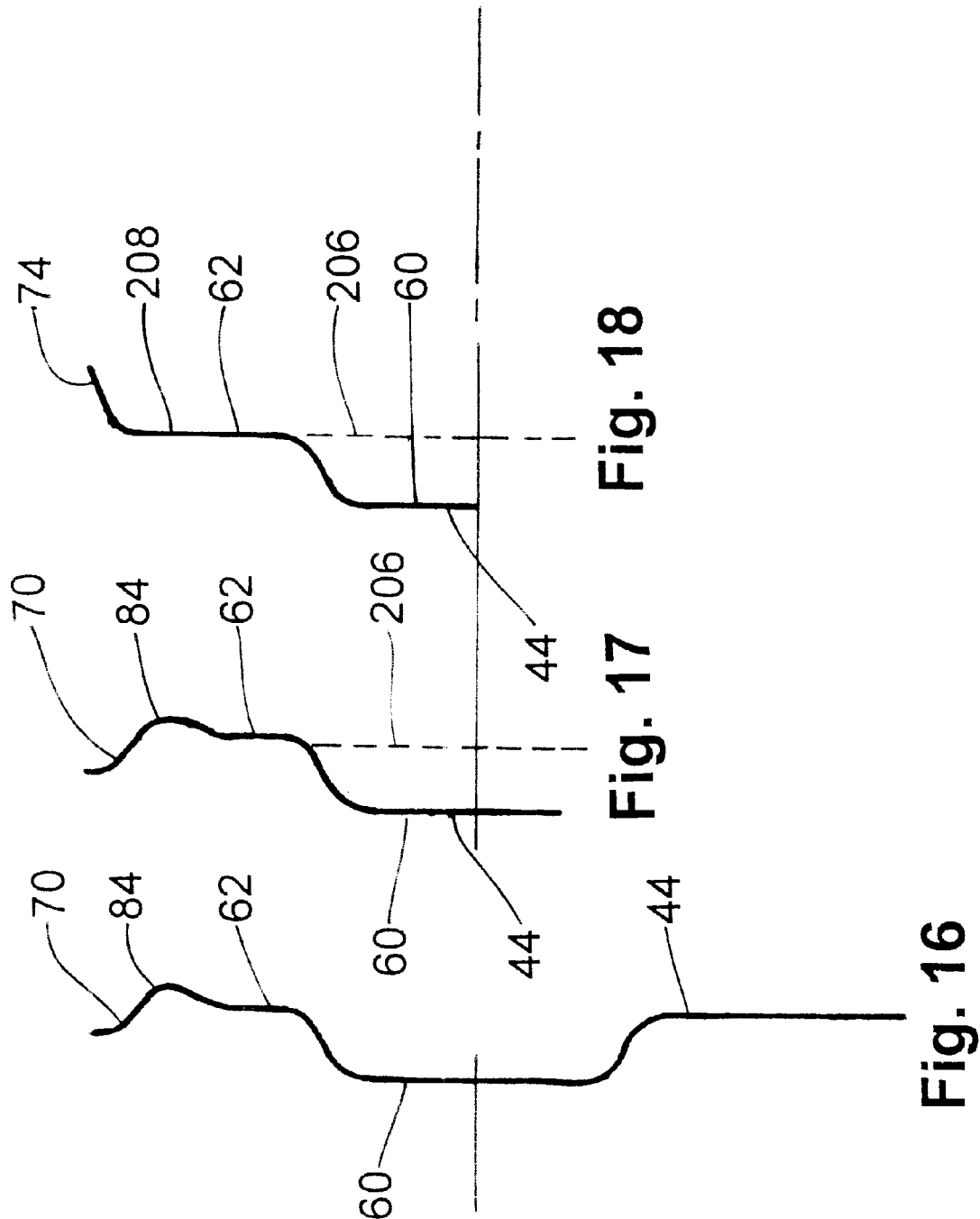

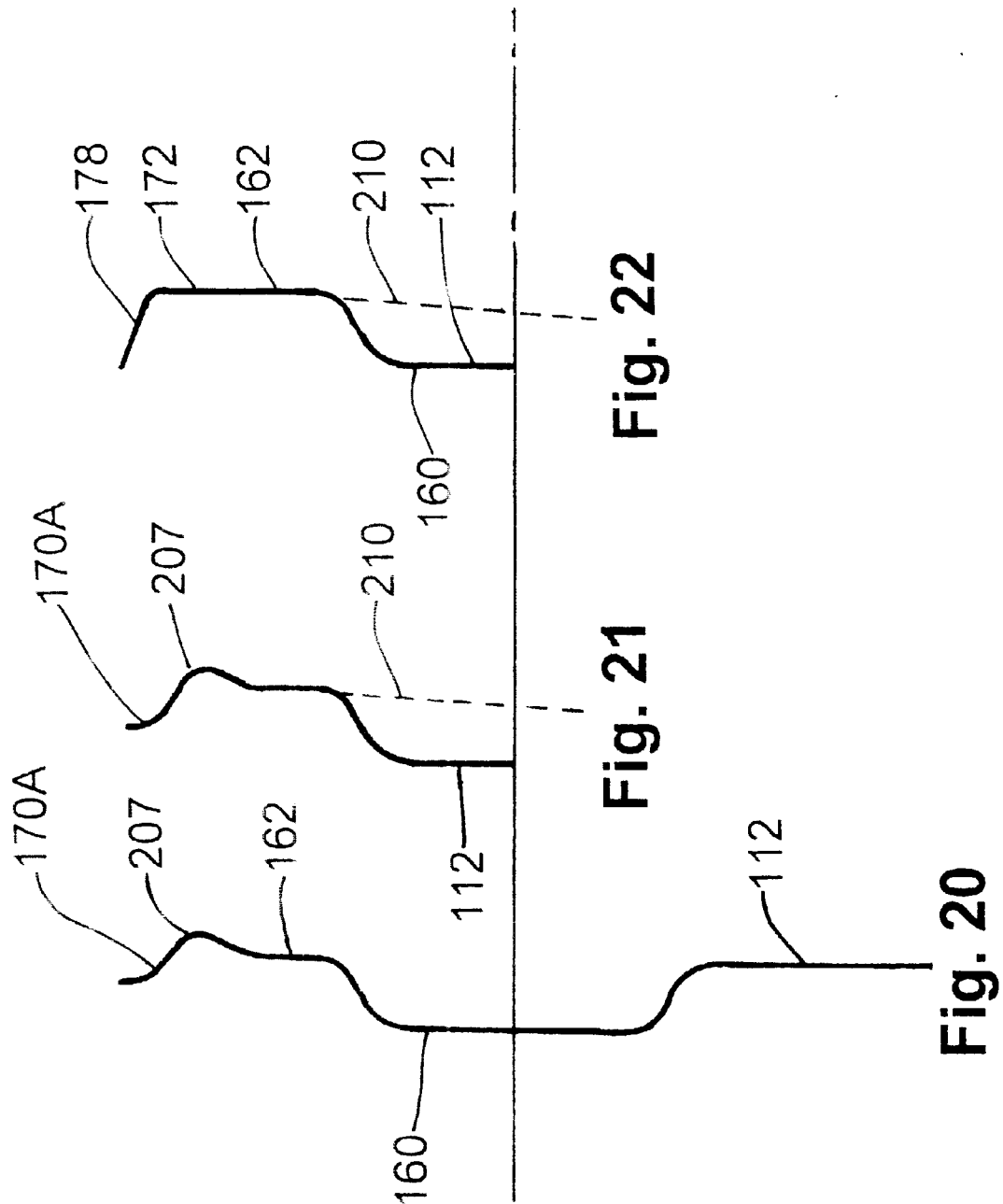

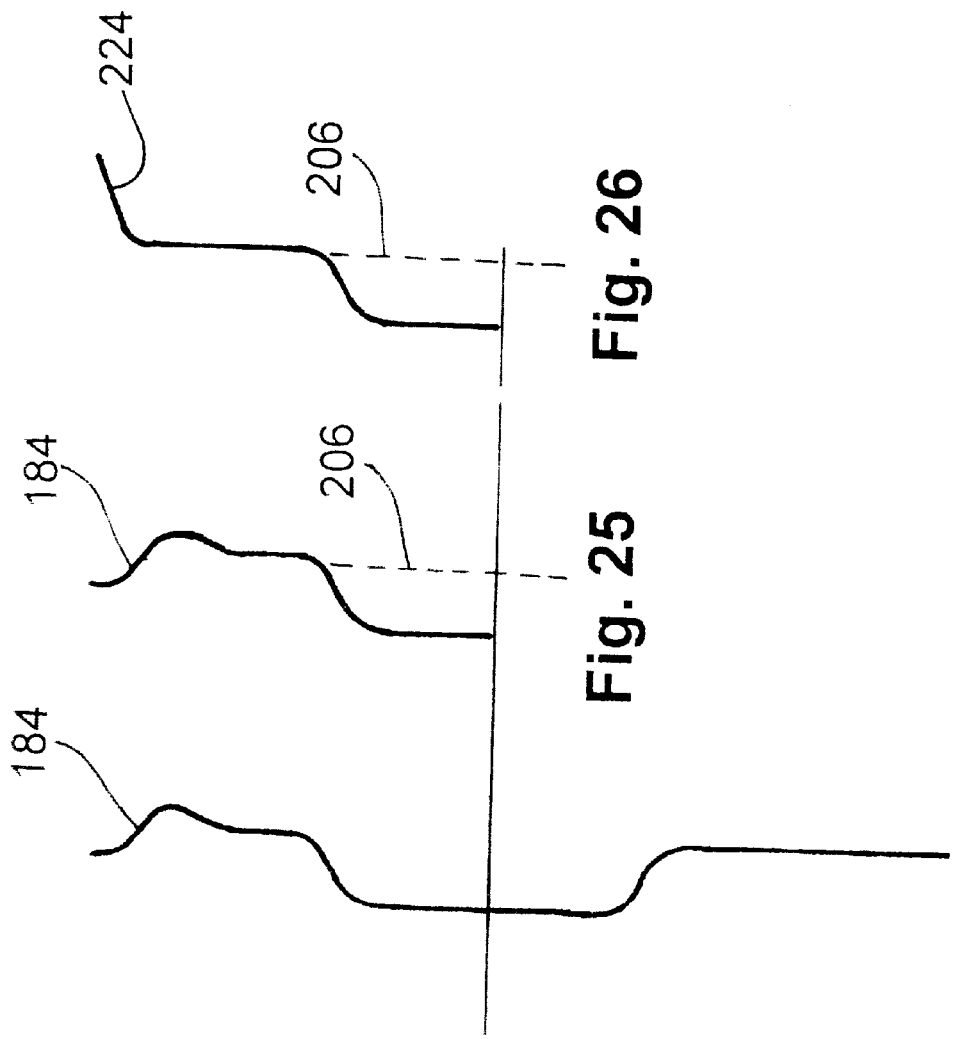

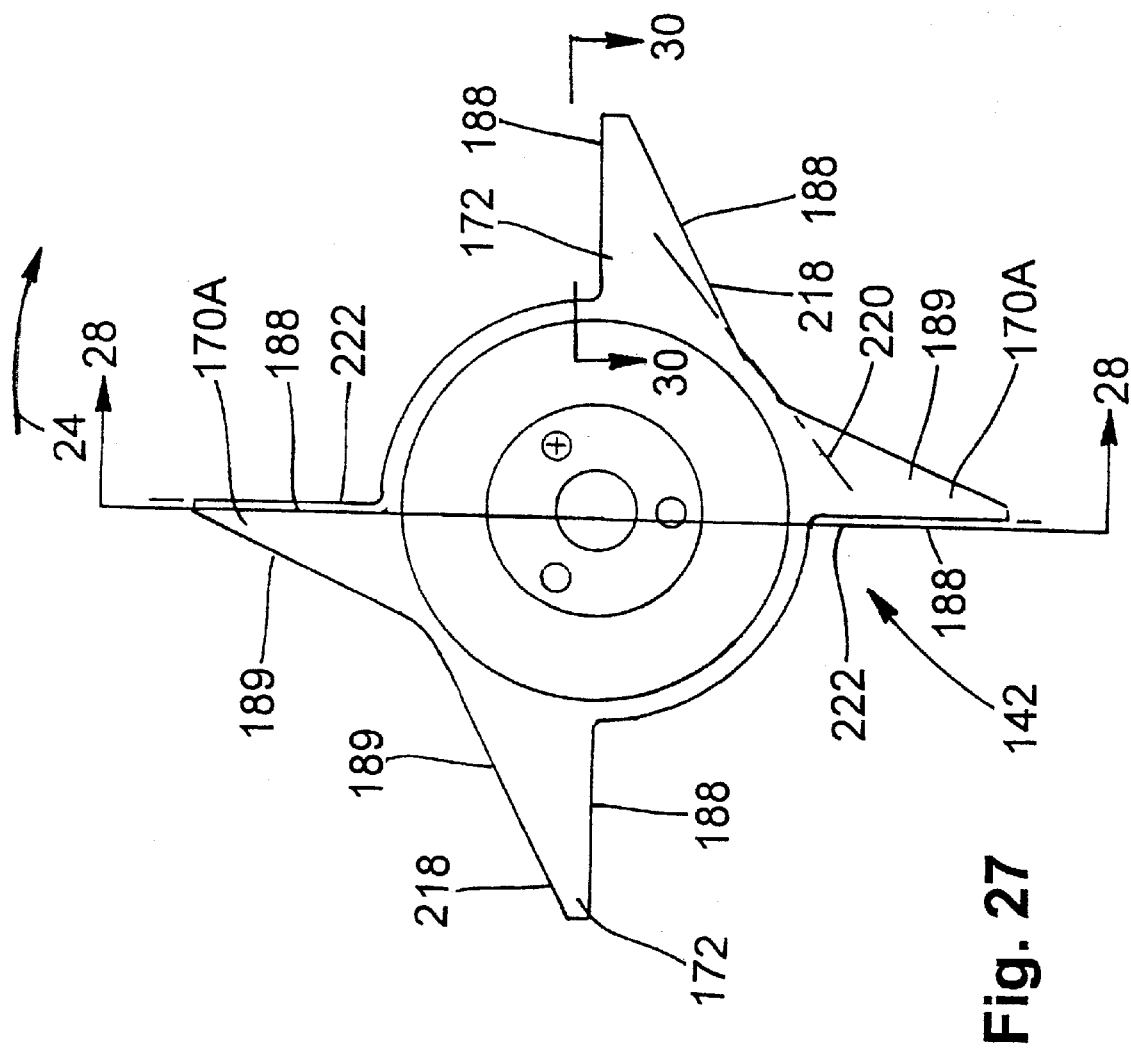

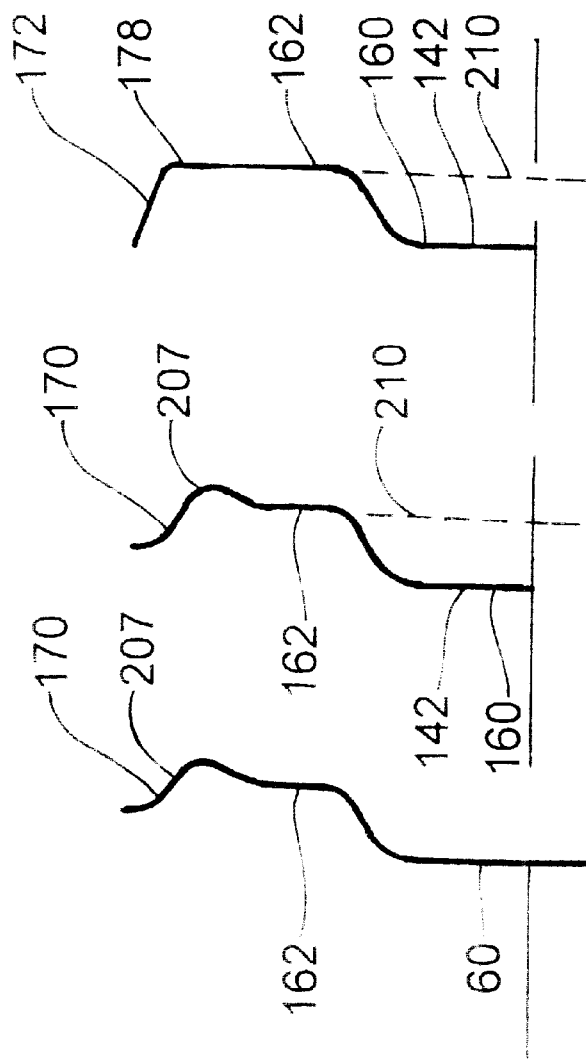

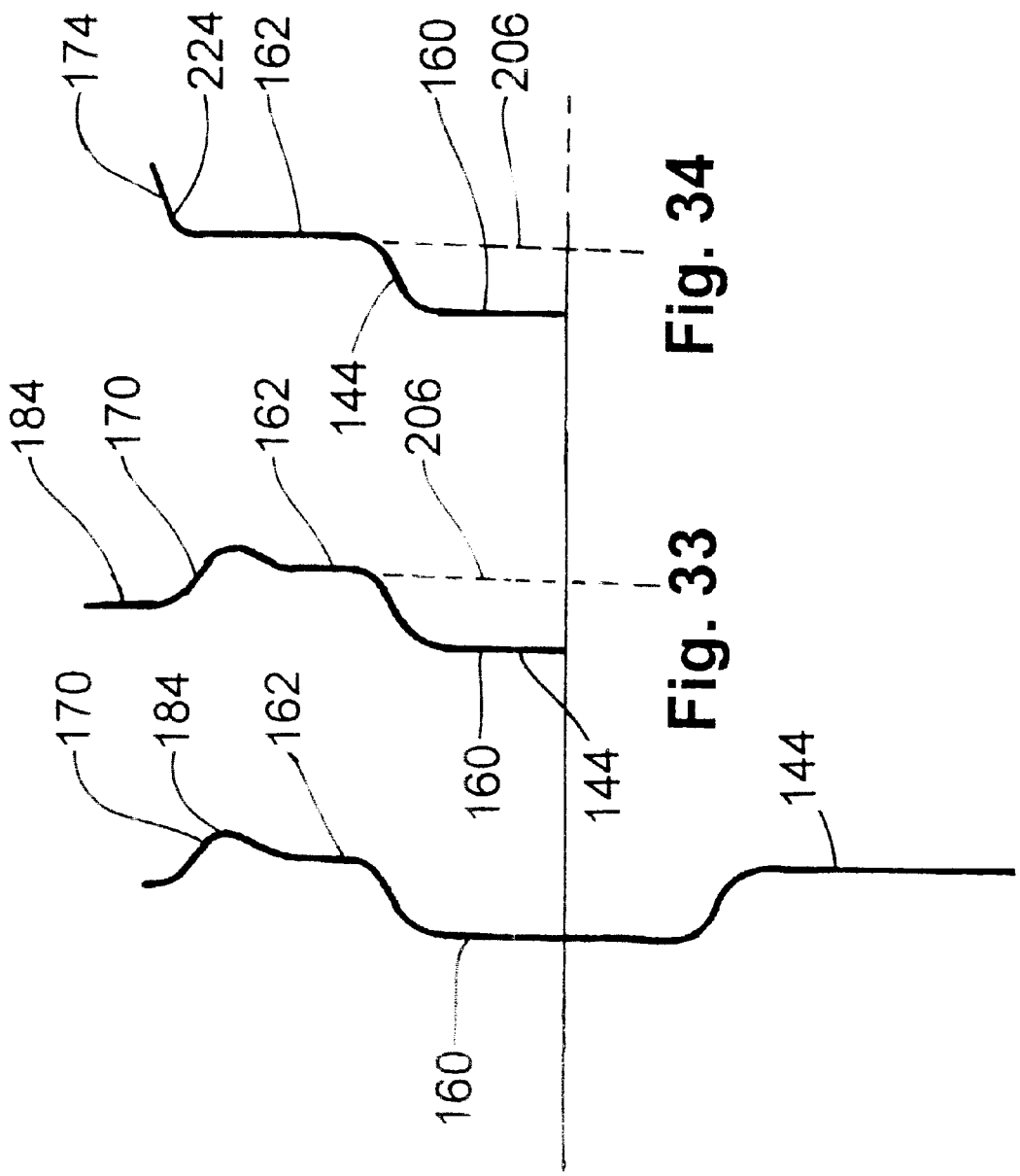

TEETH ARRANGEMENT FOR BLADE DISKS

CROSS-REFERENCE TO RELATED APPLICATIONS

This application claims priority under 35 U.S.C. §120 from U.S. Provisional Patent Application No. 60/144,720 filed Jul. 20, 1999, entitled "Rototiller Tine Arrangement," which is hereby incorporated by reference herein in its entirety.

BACKGROUND OF THE INVENTION

The present invention relates to rotatable blade assemblies for use with a tilling mechanism, and more particularly to a tooth arrangement which provides aggressive tilling action in soil having both hard, dry portions and soft portions.

Small, light weight tilling mechanisms, such as home garden rototillers or cultivators, have become very popular. Ideally, these small light-weight rototillers are gasoline powered, weigh less than 25 pounds and can be easily manipulated by a user to allow soil to be tilled such that it is broken up or pulverized into small pieces that allow free access to air and water to promote seed germination and plant growth. Such light weight rototillers typically utilize rotary blades made from formed sheet metal. Multi-toothed blades are formed as disk-like members which are secured together by a hub which serves to mount the blade on a drive axle. Typically, two blade assemblies are utilized to provide balance and stability for the rototiller during use. Typically, the teeth of the blades are triangularly shaped with a generally pointed end. The blades can be formed with various profiles in order to improve cutting efficiency in order to break up soil.

It would be desirable to provide teeth configurations for a tilling mechanism which provide more aggressive cutting in soil having both dry or hard portions and soft portions.

SUMMARY OF THE INVENTION

Briefly stated, in one aspect, the present invention is directed toward a blade assembly for use with a tilling mechanism including a first blade disk. A second blade disk is coaxially mounted to rotate with the first blade disk and is positioned in a spaced apart generally parallel fashion relative to the first blade disk. The first blade disk and the second blade disk are rotatable in a first direction. A first plurality of teeth are disposed on the first blade disk. Each of the first plurality of teeth have a first leading edge which extends generally radially outwardly from the first blade disk. A second plurality of teeth are disposed on the second blade disk. Each of the second plurality of teeth has a second leading edge which extends generally linearly outwardly from the second blade disk in a direction counter to the first direction. The second leading edge forms an obtuse angle as measured relative to a line extending in the first direction tangent to the second blade disk.

In another aspect, the present invention is directed to a blade assembly for use with a tilling mechanism including a first blade disk. A second blade disk is coaxially mounted to rotate with the first blade disk and is positioned in a spaced apart generally parallel fashion relative to the first blade disk. The first blade disk and the second blade disk are rotatable in a first direction. At-least-two-first-disk-bolo-teeth and at-least-two-first-disk-S-teeth are disposed on the first blade disk. A first leading edge of each of the at-least-two-first-disk-bolo-teeth extends generally linearly outwardly from the first blade disk in a direction counter to the first direction. The first leading edge forming a first obtuse angle as measured relative to a first line extending in the first direction tangent to the first blade disk. A second leading edge of each of the at-least-two-first-disk-S-teeth extends generally radially outwardly from the first blade disk. At-least-two-second-disk-bolo-teeth and at-least-two-second-disk-S-teeth are disposed on the second blade disk. A third leading edge of each of the at-least-two-second-disk-bolo-teeth extends generally linearly outwardly from the second blade disk in a direction counter to the first direction. The third leading edge forms a second obtuse angle as measured relative to a second line extending in the first direction tangent to the second blade disk. A fourth leading edge of each of the at-least-two-second-disk-S-teeth extends generally radially outwardly from the second blade disk.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings preferred embodiments which are presently preferred. It should be understood, however, that the invention is not limited to the precise arrangements and instrumentalities shown. In the drawings:

FIG. 4 is a cross-sectional view of the second blade disk taken along lines 4—4 in FIG. 3;

FIG. 5 is a partial cross-sectional view showing the configuration of one of the at-least-two-second-disk-S-teeth shown in FIG. 3;

FIG. 6 is a cross-sectional view showing the configuration of one of the at-least-two-second-disk-bolo-teeth of the second blade disk shown in FIG. 3;

FIG. 8 is a cross-sectional view of the first blade disk taken along lines 8—8 in FIG. 7;

FIG. 9 is a partial cross-sectional view showing the configuration of one of the at-least-two-S-teeth of the first blade disk shown in FIG. 7;

FIG. 10 is a cross-sectional view showing the configuration of one of the at-least-two-first-disk-bolo-teeth of the first blade disk shown in FIG. 7;

FIG. 12 is a cross-sectional view of the second blade disk taken along lines 12—12 in FIG. 11;

FIG. 13 is a partial cross-sectional view showing the configuration of one of the at-least-two-second-disk-S-teeth of the second blade disk shown in FIG. 11;

FIG. 14 is a cross-sectional view showing the configuration of one of the at-least-two-second-disk-bolo-teeth of the second blade disk shown in FIG. 11;

FIG. 16 is a cross-sectional view of the first blade disk taken along lines 16—16 in FIG. 15;

FIG. 17 is a partial cross-sectional view showing the configuration of one of the at-least-two-first-disk-S-teeth of the first blade disk shown in FIG. 15;

FIG. 18 is a cross-sectional view showing the configuration of one of the at-least-two-bolo-teeth of the first blade disk shown in FIG. 15;

FIG. 20 is a cross-sectional view of the second blade disk taken along lines 20—20 in FIG. 19;

FIG. 21 is a partial cross-sectional view showing the configuration of one of the at-least-two-second-disk-S-teeth of the second blade disk shown in FIG. 19;

FIG. 22 is a cross-sectional view showing the configuration of one of the at-least-two-second-disk-bolo-teeth of the second blade disk shown in FIG. 19;

FIG. 24 is a cross-sectional view of the first blade disk taken along lines 24—24 in FIG. 23;

FIG. 25 is a partial cross-sectional view showing the configuration of one of the at-least-two-first-disk-S-teeth of the first disk shown in FIG. 23;

FIG. 26 is a cross-sectional view showing the configuration of one of the at-least-two-first-disk-bolo-teeth of the first blade disk shown in FIG. 23;

FIG. 27 is a right side elevational view, similar to FIG. 11, of a second preferred embodiment of the second disk of the second blade assembly in accordance with the present invention;

FIG. 28 is a cross-sectional view of the second blade disk taken along lines 29—29 in FIG. 27;

FIG. 29 is a partial cross-sectional view showing the configuration of one of the at-least-two-second-disk-S-teeth of the second blade disk shown in FIG. 27;

FIG. 30 is a cross-sectional view showing the configuration of one of the at-least-two-second-disk-bolo-teeth of the second disk shown in FIG. 27;

FIG. 32 is a cross-sectional view of the first blade disk taken along lines 33—33 in FIG. 31;

FIG. 33 is a partial cross-sectional view showing the configuration of one of the at-least-two-first-disk-S-teeth of the first blade disk shown in FIG. 31; and FIG. 34 is a cross-sectional view showing the configuration of one of the at-least-two-first-disk-bolo-teeth of the first blade disk shown in FIG. 31.

DETAILED DESCRIPTION OF THE INVENTION

Figure 1:
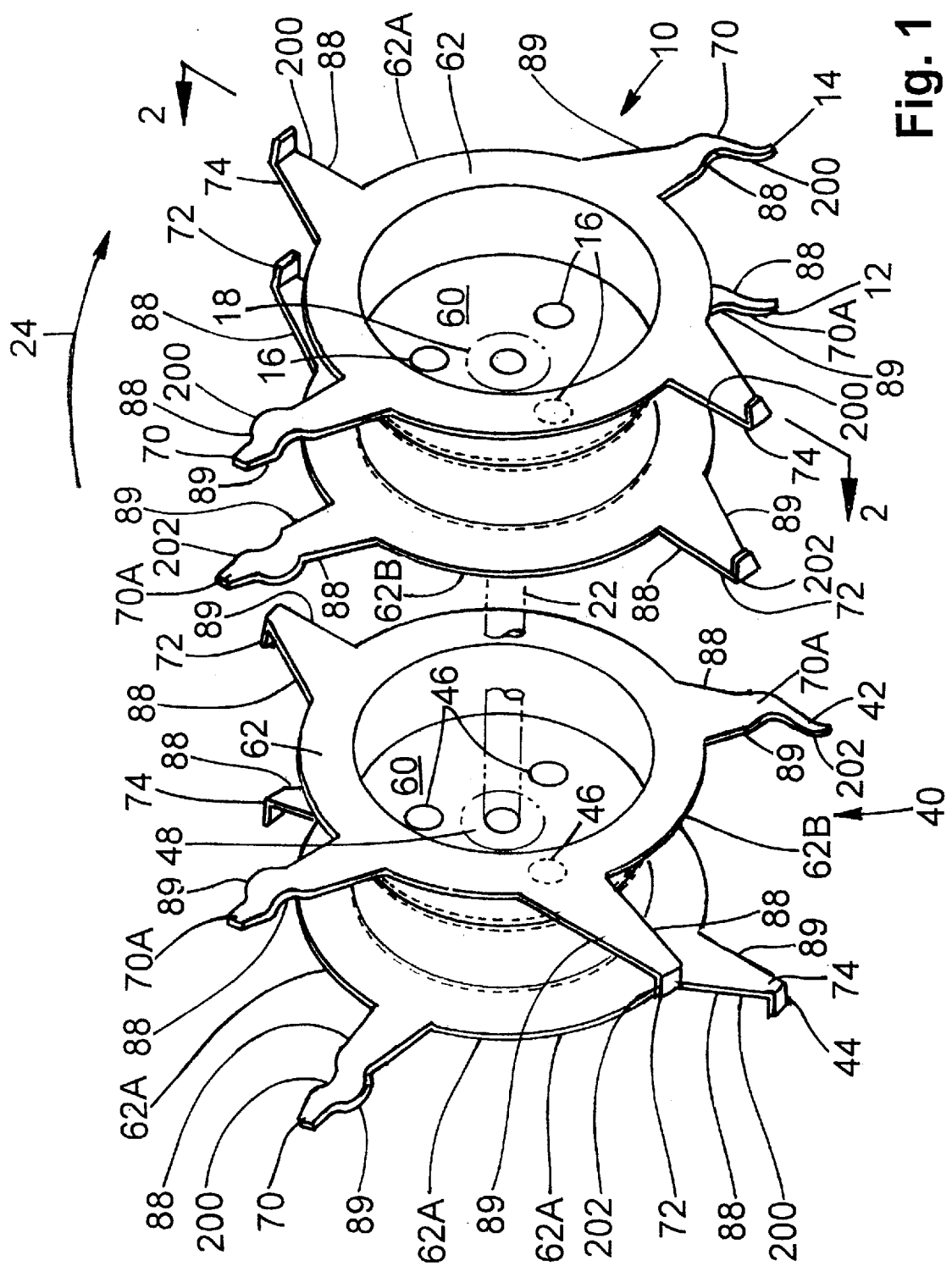
FIG. 1 is an isometric view of a first and second blade assembly attached to the drive shaft of a tilling mechanism in accordance with a first preferred embodiment of the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the teeth assemblies for a tilling mechanism in accordance with the present invention and designated parts thereof. The terminology includes the words above specifically mentioned, derivatives thereof and words of similar import. Additionally, the word "a," as used in the claims and in the corresponding portions of the specification, means "at least one."

Referring to the drawings in detail, FIGS. 1–18 illustrate a first preferred embodiment of a first and second blade assembly 10, 40. FIGS. 19–34 illustrate a second preferred embodiment of a first and second blade assembly. Generally speaking, a blade assembly 10 or 40 for use with a tilling mechanism (not shown) preferably includes a first blade disk 14, 44 (further described below). A second blade disk 12, 42 (further described below) is coaxially mounted to rotate with the first blade disk 14, 44 and is positioned in a spaced apart generally parallel fashion relative to the first blade disk 14, 44. The first blade disk 14, 44 and the second blade disk 12, 42 are rotatable in a first direction 24 (as shown by the arrow denoted 24).

Figure 3:
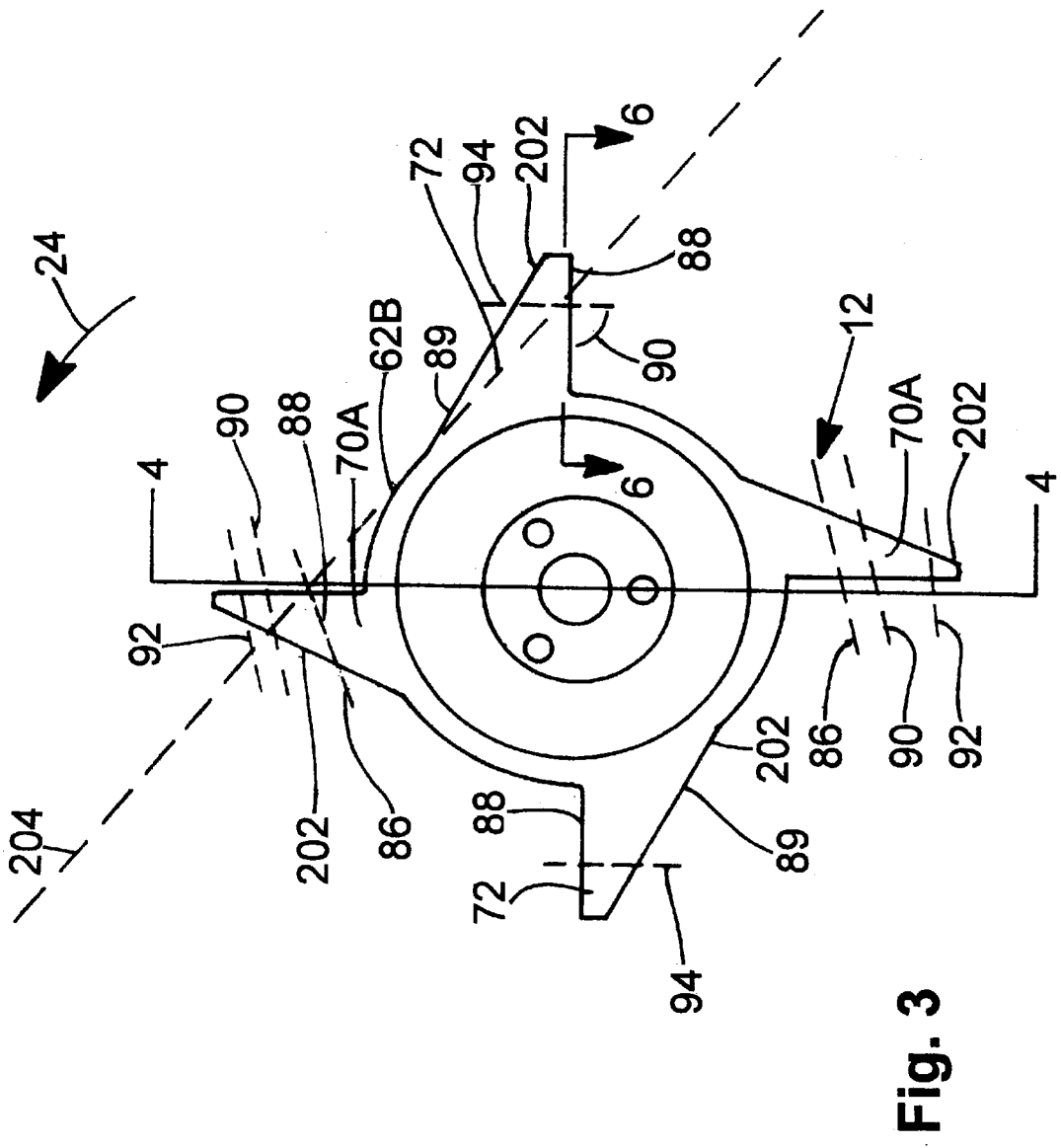
FIG. 3 is a left side elevational view of a second blade disk of the first blade assembly of FIG. 1.
Figure 7:
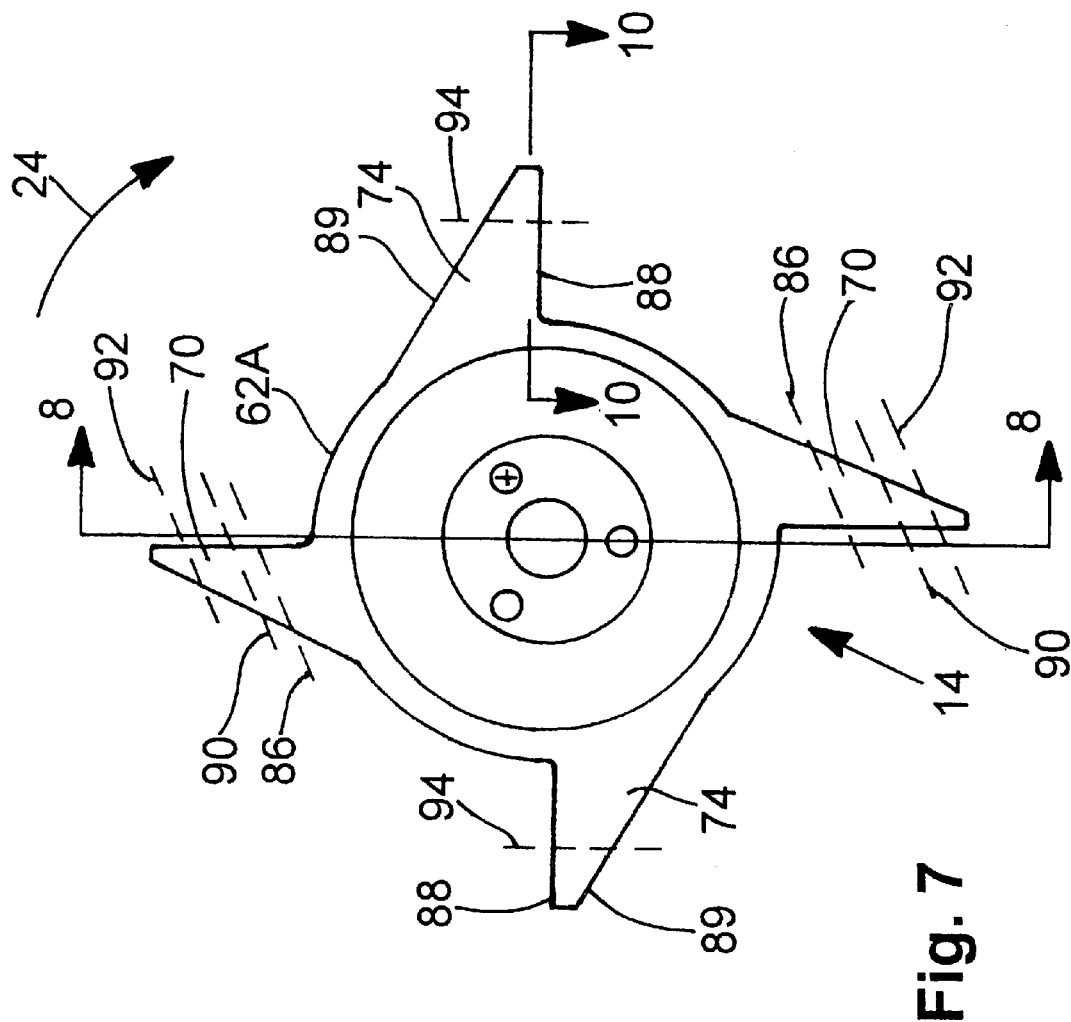
FIG. 7 is a right side elevational view of a first blade disk of the first blade assembly of FIG. 1.
Figure 11:
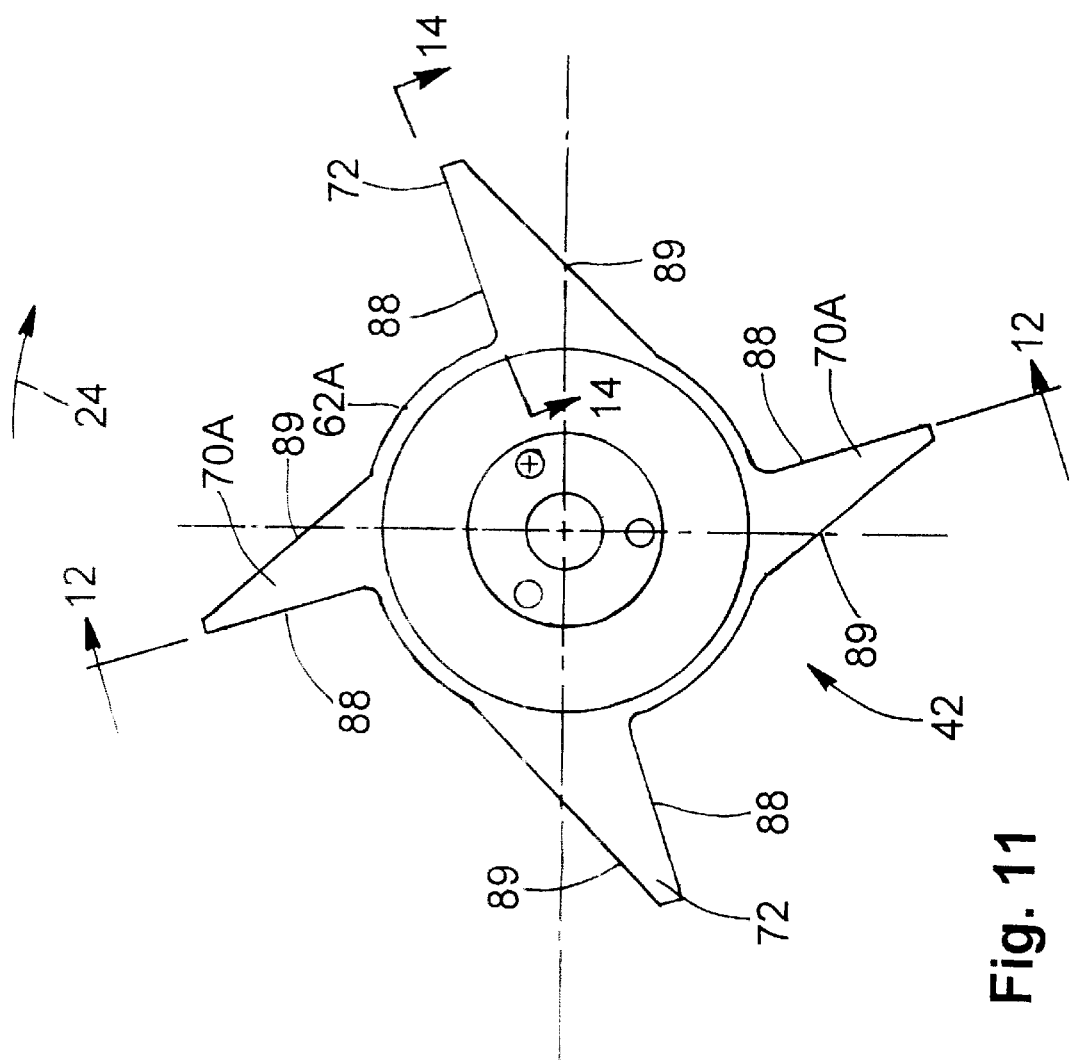
FIG. 11 is a right side elevational view of a second blade disk of the second blade assembly shown in FIG. 1.
Figure 15:
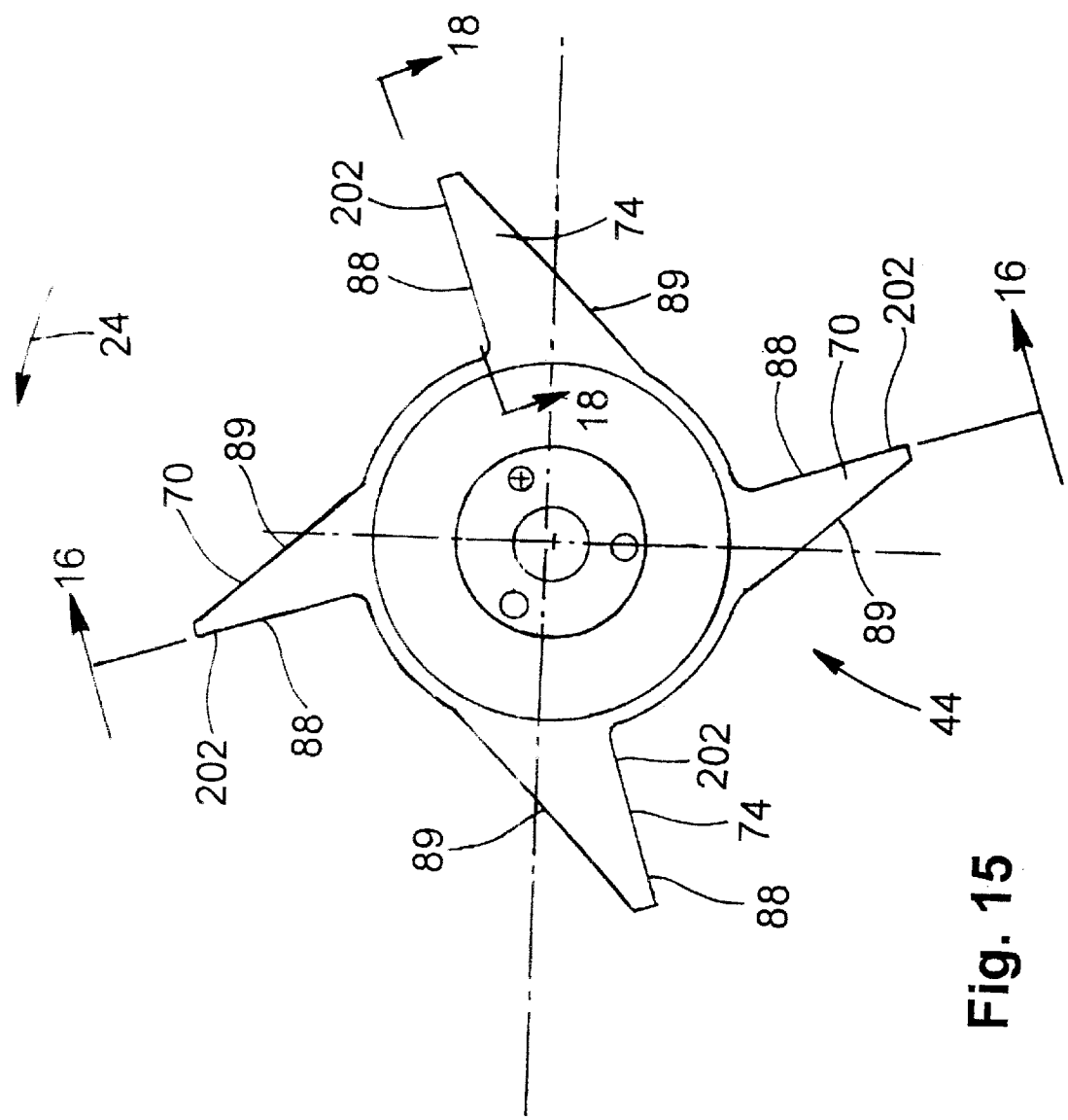
FIG. 15 is a left side elevational view of a first blade disk of the second blade assembly shown in FIG. 1.

Referring to FIG. 1, the first and second blade assemblies 10, 40 for a tilling mechanism (not shown) are illustrated in the operating position. The first and second blade assemblies 10, 40 each comprise first and second blade disks 14, 44 and 12, 42, respectively. The first blade disks 14, 44 are preferably located on the outwardly facing sides of the first and second blade assemblies 10, 40 and the second blade disks 12, 42 are preferably located on the inwardly facing sides of the first and second blade assemblies 10, 40. Referring to FIGS. 7 and 15, a first plurality of teeth 70, 72 (further described below) are disposed on the first blade disk 14, 44. Each of the first plurality of teeth 70, 74 have a first leading edge 200 which extends generally radially outwardly from the first blade disk 14, 44. Referring to FIGS. 1, 3 and 11, a second plurality of teeth 70A, 72 (further described below) are positioned on the second blade disk 12, 42. Each of the second plurality of teeth 70A, 72 have a second leading edge 202 which extends generally linearly outwardly from the second blade disk 12, 42 in a direction counter to the first direction 24. The second leading edge 202 forms an obtuse angle as measured relative to a line 204 extending in the first direction 24 tangent to the second blade disk 12, 42.

The individual blade disks are preferably formed of a suitable high strength, durable material such as hardened steel. However, those of ordinary skill in the art will appreciate from this disclosure that the individual blade disks can be formed of other suitable materials such as alloy or the like without departing from the scope of the present invention.

Referring to FIG. 1, the first and second blade disks 14, 12 and 44, 42 are assembled via holes 16, 46 respectively to respective hubs 18, 48, shown in dashed lines, to form the first and second blade assemblies 10, 40. The hubs 18, 48 are used to connect the first and second blade assemblies 10, 40 to a shaft 22 (shown in phantom lines) which is preferably driven in the clockwise direction, as shown by arrow 24 in FIG. 1, by a suitable motor and transmission (not shown).

It is preferred, but not necessary, that the first and second blade assemblies 10, 40 are driven at approximately 240 rpm by a ¾ to 1 horsepower motor. The specific arrangement of the motor and transmission can be varied, as desired. For example, the first and second blade assemblies can be driven at any other desired speed, such as 200 rpm or the like, without departing from the scope of the present invention. Since tilling mechanisms of this type utilizing two blade assemblies driven by a motor/transmission assembly are generally known, further description has been omitted from the present application for the sake of brevity.

The present invention relates primarily to the configuration of the teeth, also referred to as tines by those of ordinary skill in the art, located on the first and second blade disks 14, 12 and 44, 42 which provide for improved and more aggressive digging and tilling action for tilling mechanisms, such as rototillers, cultivators or the like. As shown in FIG. 1, each blade disk 12, 14, 42, 44 includes a raised, generally planar, peripheral portion 62 which extends about a bowl-shaped central portion 60 through which the holes 16, 46 are located.

Referring to FIGS. 7 and 15, the first blade disk 14, 44 preferably, but not necessarily, has a first plurality of teeth 70, 74 which includes at-least-two-first-disk-S-teeth 70 (further described below) and at-least-two-first-disk-bolo-teeth 74 (further described below). The at-least-two-first-disk-S-teeth 70 and the at-least-two-first-disk-bolo-teeth 74 are preferably, but not necessarily, individually arranged in an alternating fashion about the first blade disk 14, 44.

Referring now to FIGS. 1, 2 and 7–10, the first blade disk 14, 44 is shown in detail. It is preferable, but not necessary, that each of the at-least-two-first-disk-S-teeth 70 has a first major surface 84 which faces generally outwardly from the blade assembly 10, 40 and extends: generally radially outwardly from a first circumference 62A, along a first plane 206 containing the first circumference 62A of the first blade disk 14, 44, of the first blade disk 14, 44 a first predetermined distance; then, extends generally outwardly from the first and second blade assemblies 10,40 a second predetermined distance; then, extends generally toward the blade assembly 10, 40 past the first plane 206 by a third predetermined distance; and then, extends in a direction parallel to the first plane 206.

The first predetermined distance is preferably measured generally perpendicular to the first plane 206. The second and third predetermined distances are preferably measured generally perpendicularly to the first plane 206. It is preferable that the first predetermined distance be within the range of approximately 0.1 inches and approximately 1 inch. It is more preferred that the first predetermined distance be within the range of approximately 0.4 inches and 0.8 inches. It is still more preferred that the first predetermined distance be approximately 0.627 inches. It is preferable that the second predetermined distance be within the range of approximately 0.1 inches and approximately 1 inch. It is more preferred that the second predetermined distance be within the range of approximately 0.15 inches and 0.5 inches. It is still more preferred that the second predetermined distance be approximately 0.233 inches. It is preferable that the third predetermined distance be within the range of approximately 0.1 inches and approximately 1.5 inches. It is more preferred that the third predetermined distance be within the range of approximately 0.2 inches and 0.5 inches. It is still more preferred that the third predetermined distance be approximately 0.38 inches. While specific preferred ranges have been mentioned for the first through third predetermined distances, those of ordinary skill in the art will appreciate from this disclosure that the sizing of the individual at-least-two-first-disk-S-teeth 70 can be varied depending on the size of the tilling mechanism (or other factors) without departing from the scope of the present invention.

Referring to FIGS. 7 and 10, each of the at-least-two-first-disk-bolo-teeth 74 preferably, but not necessarily, has a second major surface 208 which faces generally outwardly from the first and second blade assemblies 10, 40 and extends: generally radially outwardly from the first blade disk 14, 44, along the first plane 206, for a fourth predetermined distance; and then, bends through an angle in the range of approximately sixty (60) degrees and approximately ninety-five (95) degrees and extends generally outwardly from the blade assembly. It is preferable, but not necessary that the bend be through an angle of approximately seventy degrees. It is preferable that the fourth predetermined distance (which is measured generally parallel to the first plane 206) be within the range of approximately 1 inch and approximately 2.5 inches. It is more preferred that the fourth predetermined distance be within the range of approximately 1.3 inches and 1.9 inches. It is still more preferred that the fourth predetermined distance be approximately 1.605 inches. Those of ordinary skill in the art will appreciate from this disclosure that the sizing of the individual at-least-two-first-disk-bolo-teeth 74 can be varied without departing from the scope of the present invention.

Referring to FIG. 1, each blade disk 12, 14, 42, 44 preferably, but not necessarily, includes four teeth in a predefined configuration to provide superior performance in aggressive mixing and pulverization of hard soil. The specific combination of S-teeth 70, 70A, 170, 170A and bolo teeth 72, 74, 172, 174 provide for superior digging action in both hard and soft soil. It is also preferred that the teeth be spaced approximately ninety (90) degrees apart. However, those of ordinary skill in the art will appreciate from this disclosure that that the relative spacing of the individual teeth can be varied without departing from the scope of the present invention. Additionally, those of ordinary skill in the art will appreciate from this disclosure that the number of teeth about each blade disk 12, 14, 42, 44 may be five, six or more teeth without departing from the scope of the present invention.

Referring to FIGS. 3 and 7 or to FIGS. 11 and 15, the first blade disk 14, 44 has a similar configuration to the second blade disk 12, 42 to which it is connected to form one of the first and second blade assemblies 10, 40 of the first preferred embodiment of the invention. The at-least-two-first-disk-S-teeth 70 and the at-least-two-second-disk-S-teeth 70A have the same configuration. The at-least-two-second-disk-bolo-teeth 72 are similar to the at-least-two-first-disk-bolo-teeth 74. However, as shown in detail in FIG. 10, each of the at-least-two-first-disk-bolo-teeth 74 are bent in a direction outward from the blade assembly 10, 40. In contrast, (and as shown in FIG. 6) the at-least-two-second-disk-bolo-teeth 72 are preferably bent in a direction toward the corresponding first blade disk 14, 44 (or inwardly toward the center of the respective blade assembly 10, 40).

As shown in FIGS. 3 and 11, the second blade disk 12, 42 preferably, but not necessarily, has a second plurality of teeth 70A, 72 which includes at-least-two-second-disk-S-teeth 70A (further described below) and at-least-two-second-disk-bolo-teeth teeth 72 (further described below). The at-least-two-second-disk-S-teeth 70A and the t-least-two-second-disk-bolo-teeth 72 are preferably, but not necessarily, individually arranged in an alternating fashion about the second blade disk 12, 42.

That is, the second blade disk 12 preferably includes the second plurality of teeth 70A, 72 which has two different teeth configurations. The first tooth configuration is shown by the at-least-two-second-disk-S-teeth 70A which each have a compound or serpentine curve which is shown in detail in FIGS. 4, 5, 12 and 13. One preferred arrangement of S-teeth 70, 70A, 170, 170A is described in detail in U.S.

Pat. No. 5,299,647, which is hereby incorporated by reference as if fully set forth herein.

As shown in FIGS. 4 and 5, each of the at-least-two-second-disk-S-teeth 70A preferably, but not necessarily, has a third major surface 205 which faces generally outwardly from the blade assembly and extends: generally radially outwardly from a second circumference 62B, along a second plane 210 containing the second circumference 62B of the second blade disk 12, 42, of the second blade disk 12, 42 a fifth predetermined distance; then, extends generally outwardly from said blade assembly 10, 40 a sixth predetermined distance; then, extends generally toward the blade assembly 10, 40 past the second plane 210 by a seventh predetermined distance; and then, extends in a direction parallel to the second plane 210.

The fifth predetermined distance is preferably measured generally parallel to the second plane 210. The sixth and seventh predetermined distances are preferably measured generally perpendicular to the second plane 210. The preferable ranges for the fifth, sixth and seventh predetermined distances are generally the same as the preferred ranges for the first, second and third predetermined distances, respectively, as described above. However, those of ordinary skill in the art will appreciate from this disclosure that the sizing of the individual at-least-two-second-disk-S-teeth 70A can vary from the preferred ranges without departing from the scope of the present invention.

In other words, the at-least-two-second-disk-S-teeth 70A include a third major surface 205 which starts to bend outwardly away from the second plane 210 (which, in the first preferred embodiment, is defined by the peripheral portion 62). Referring to FIG. 3, the outward bend is formed along a bend line 86 (throughout the drawings the numerals 88, 188 are used to denote teeth surfaces that extend generally radially outwardly and the numerals 89, 189 are used to denote surfaces that extend outwardly at an angle relative to the radial direction). The third major surface 205 extends outward to a maximum offset from the peripheral portion 62 prior to curving back inwardly about a bend line 90 located parallel to the bend line 86. The next contiguous portion of the tooth 70A extends generally inwardly toward the mounting plane defined by the center of the bowl-shaped portion 60 beyond the second plane 210 defined by the raised peripheral portion 62. The tip of the tooth 70A is then bent about a third bend line 92 to extend radially outwardly in a plane generally parallel to the mounting plane defined by the bowl-shaped portion 60.

As shown in FIGS. 3 and 11, the second blade disk 12, 42 preferably includes two of the at-least-two-second-disk-S-teeth 70A located approximately one hundred-eighty (180) degrees apart from each other about the periphery of the second blade disk 12. It is also preferable that the second blade disk 12, 42 include at-least-two-second-disk-bolo-teeth 72. However, those of ordinary skill in the art will appreciate from this disclosure that a greater number of teeth can be used with uneven spacing without departing from the scope of the present invention.

Referring to FIGS. 6 and 14, it is preferable, but not necessary, that each of the at-least-two-second-disk-bolo-teeth 72 has a fourth major surface 78 which faces generally outwardly from the first and second blade assemblies 10, 40 and extends: generally radially outwardly from the second blade disk 12, 42, along the second plane 210, for an eighth predetermined distance; and then, bends through an angle in the range of approximately sixty (60) degrees and approximately nintey-five (95) degrees and extends toward the first blade disk 14, 44. It is preferable, but not necessary, that the fourth major surface 78 bend through an angle of approximately seventy (70) degrees. The preferred ranges for the eighth predetermined distance are preferably, but not necessarily, similar to the preferred ranges for the fourth predetermined distance, described above.

In other words, it is preferable that the at-least-two-second-disk-bolo-teeth 72 include a fourth major surface 78 which extends from the second plane 210 (defined by the peripheral portion 62) toward the mounting plane defined by the bowl-shaped portion 60. Referring to FIG. 3, the fourth major surface 78 of each of the at-least-two-second-disk-bolo-teeth 72 is bent along a bend line 94 which is normal to the radial edge 88 of each at-least-two-second-disk-bolo-teeth 72.

Figure 2:
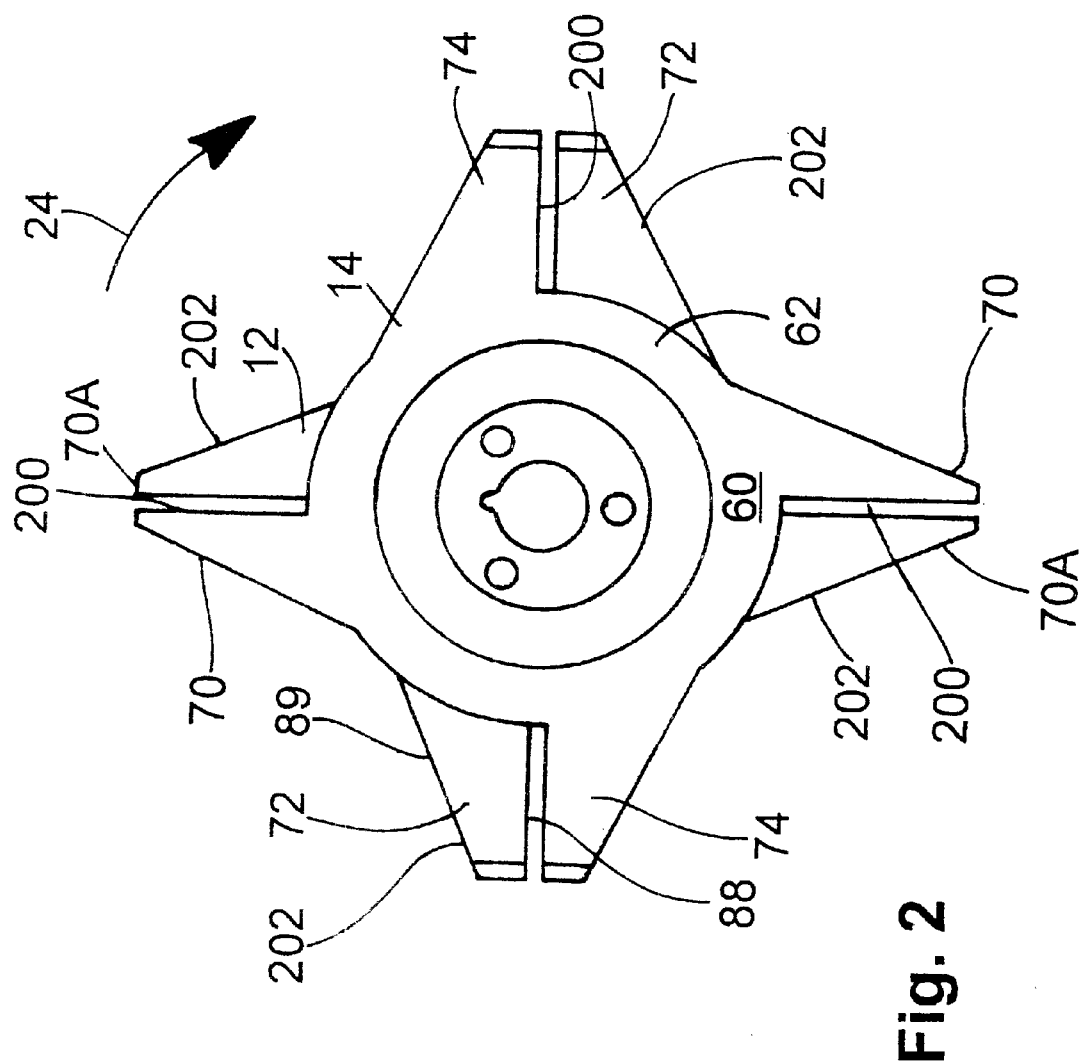
FIG. 2 is a right side elevational view of the first blade assembly shown in FIG. 1.

Referring to FIGS. 1 and 2, it will be seen that in use, the leading edge 202 of each tooth 70, 72 on the second blade disk 12, 42 is generally angled to form the above mentioned obtuse angle. This configuration provides more aggressive digging for the bolo teeth 72 which have their angled edges 89 contacting the soil first.

Referring again to FIG. 1, the first blade assembly 10 and the second blade assembly 40 are substantially symmetrical to each other (i.e., the second blade assembly 40 is substantially the same as the first blade assembly 10 with its orientation generally reversed). The second blade assembly 40 preferably includes one first blade disk 44 and one second blade disk 42, which are shown in detail in FIGS. 11–18.

Referring to FIGS. 11–14, the second blade disk 42 of the second blade assembly 40 includes at-least-two-second-disk-S-teeth 70A and at-least-two-second-disk-bolo-teeth 72. As shown in FIGS. 1 and 11, the leading edges 202 of the teeth 70A, 72 on the second blade disk 42 are angled to provide for more aggressive digging in hard soil with the at-least-two-second-disk-bolo-teeth 72. The at-least-two-second-disk-S-teeth 70A provide for better chopping of the soil to a fine consistency.

Furthermore, the combination of S-teeth 70, 70A, 170, 170A and bolo-teeth 72, 74, 172, 174 having the preferred configurations provides for superior digging action in both hard and soft soil.

Referring to FIGS. 15–18, the first blade disk 44 of the second blade assembly 40 preferably includes at-least-two-first-disk-S-teeth 70 and at-least-two-first-disk-bolo-teeth 74. As shown in FIG. 1, the leading edges 202 of the teeth 70, 74 on the first blade disk 44 of the second blade assembly 40 extend in a generally radial direction. While this does not provide as aggressive tilling of dry, hard soil by the at-least-two-first-disk-bolo-teeth 74, it has nonetheless proven to be more effective than the prior known configurations which did not include at-least-two-first-disk-bolo-teeth 74.

Referring now to FIGS. 19–34, a second preferred embodiment of the first and second blade disks 114, 112, 144, 142 for use with first and second blade assemblies is shown. The blade disks of the second preferred embodiment are generally similar to blade disks of the first preferred embodiment and are preferably, but not necessarily, arranged in a similar manner.

Generally speaking, a blade assembly (either the first or second blade assembly) according to the second preferred embodiment is preferably used with a tilling mechanism and includes a first blade disk 114, 144. A second blade disk 112, 142 is coaxially mounted to rotate with the first blade disk 114, 144 and is positioned in a spaced apart generally parallel fashion relative to the first blade disk 114, 144. The first blade disk 114, 144 and the second blade disk 112, 142 are rotatable in a first direction (as denoted by the arrow 24 in FIG. 19).

In order to provide a complete description of the second preferred embodiment of the first and second blade assemblies without repeating the common description already provided in connection with the first preferred embodiment, many like elements in the second preferred embodiment have been identified with like numerals to the corresponding elements in the first preferred embodiment with the prefix 1. For example, the at-least-two-first-disk-S-teeth 170 of the second preferred embodiment are similar to the at-least-two-first-disk-S-teeth 70 of the first preferred embodiment of the invention. Accordingly, the following description will be largely limited to describing many of the differences between the first preferred embodiment and the second preferred embodiment.

Figure 23:
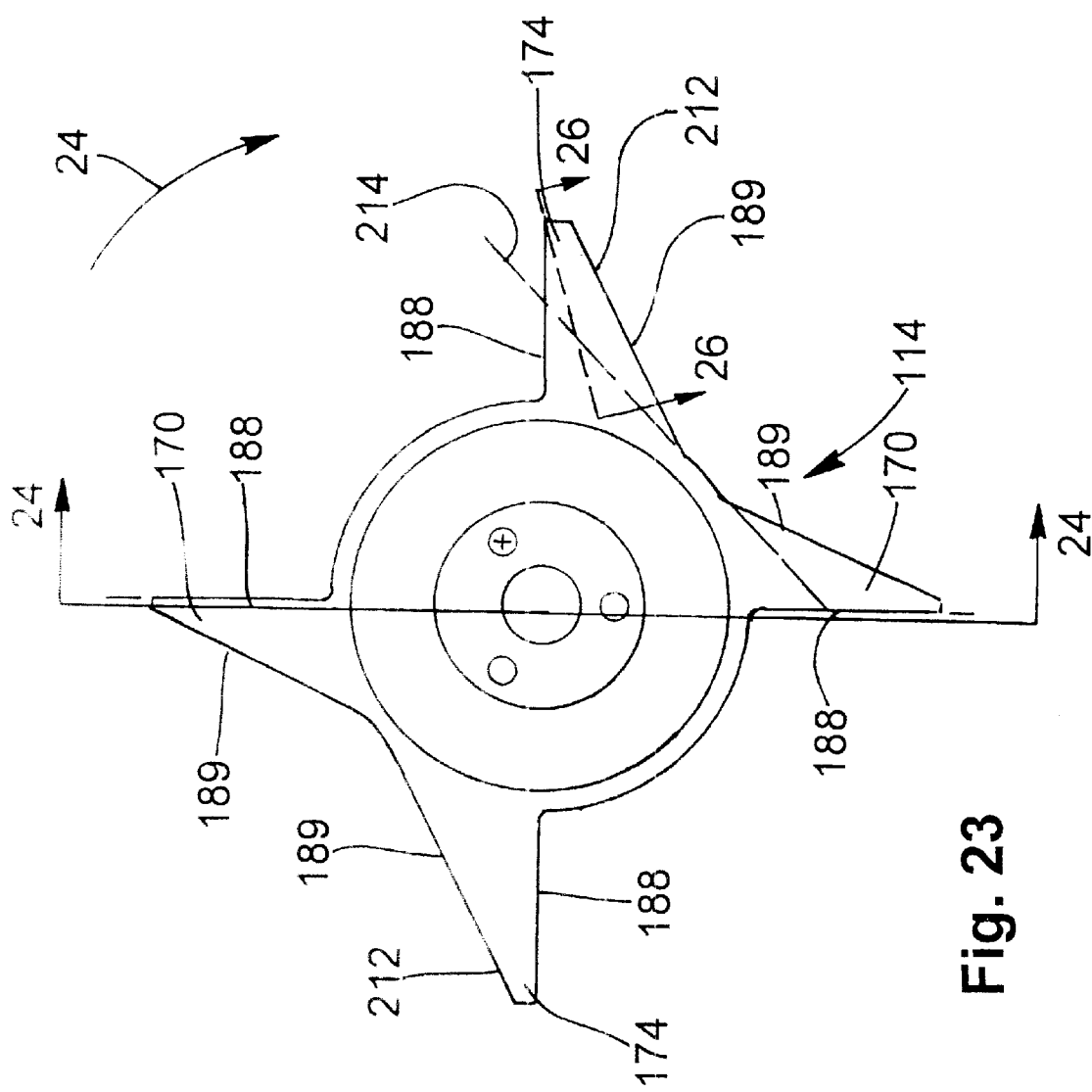
FIG. 23 is a right side elevational view, similar to FIG. 7, of a first blade disk for the first blade assembly in accordance with a second preferred embodiment of the present invention.
Figure 31:
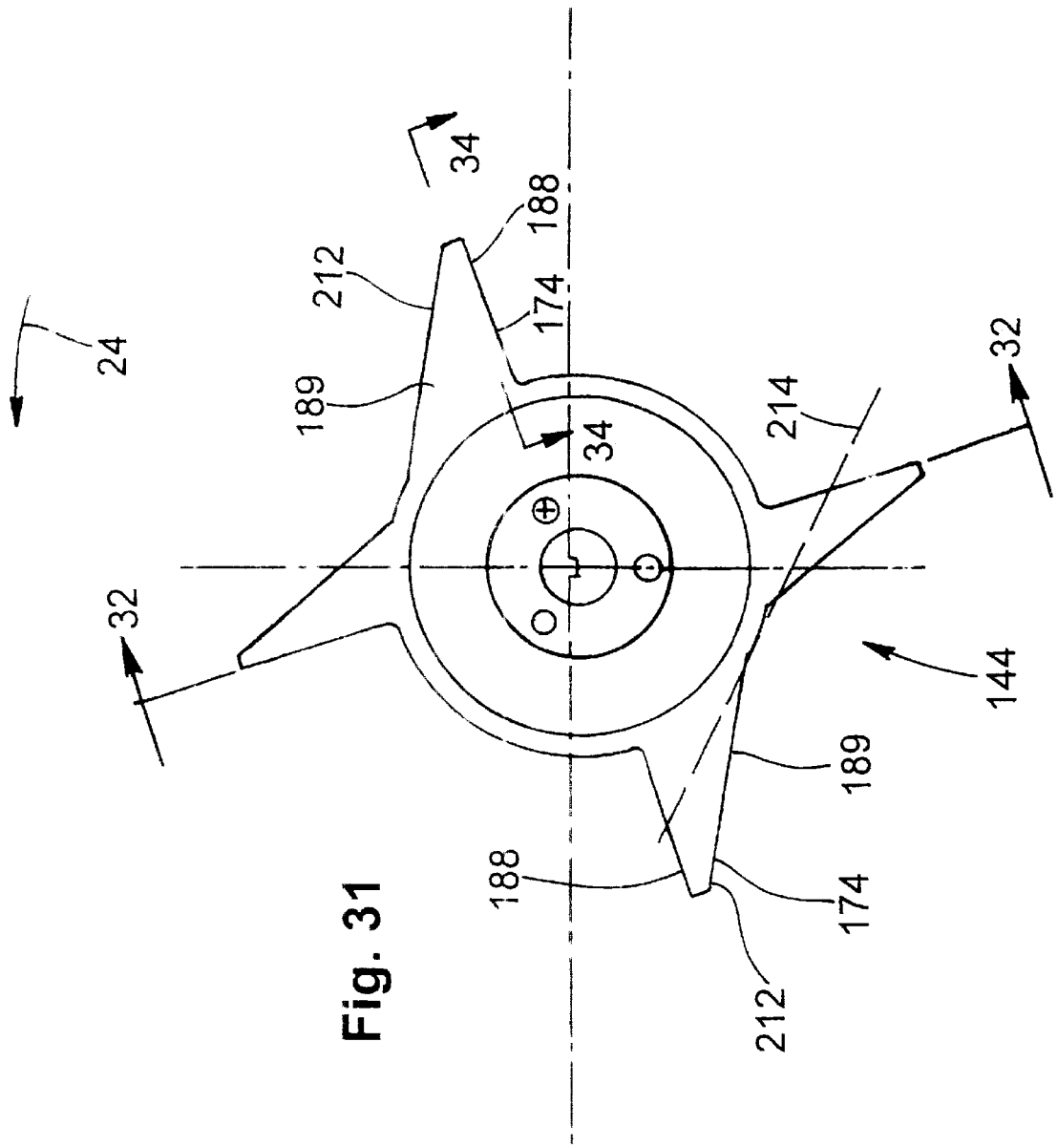
FIG. 31 is a left side elevational view, similar to FIG. 15, of the second preferred embodiment of the first blade disk for the second blade assembly in accordance with the present invention.

Referring to FIGS. 23 and 31, in either the first or second blade assembly of the second preferred embodiment at-least-two-first-disk-bolo-teeth 174 and at-least-two-first-disk-S-teeth 170 are disposed on the first blade disk 114, 144. A first leading edge 212 of each of the at-least-two-first-disk-bolo-teeth 174 extends generally linearly outwardly from the first blade disk 114, 144 in a direction counter to the first direction 24. The first leading edge 212 forming a first obtuse angle as measured relative to a first line 214 extending in the first direction tangent to the first blade disk 114, 144. A second leading edge 188 of each of the at-least-two-first-disk-S-teeth 170, 170A extends generally radially outwardly from the first blade disk 114, 144. A preferred range for the first obtuse angle is preferrably between about ninety-three degrees and about one hundred-seventy-five degrees. More preferably, the first obtuse angle is within the range of approximately one hundred thirty-five degrees and approximately one hundred-sixty degrees. However, those of ordinary skill in the art will appreciate from this disclosure that various obtuse angles can be used without departing from the scope of the present invention.

Referring now to FIGS. 31–34, the first blade disk 144 of the second blade assembly (which, in terms of position in the tilling mechanism, would correspond to the first blade disk 44 of the second blade assembly 40 in the first preferred embodiment shown in FIG. 1) is shown. The teeth of the first blade disk 144 are arranged such that the leading edges 212 (as the blade disk 144 is rotated in the first direction 24) of the at-least-two-first-disk-bolo-teeth 174 are angled (i.e., form a first obtuse angle as measured relative to a first line 214 extending in the first direction tangent to the first blade disk 114, 144). The leading edges of the at-least-two-first-disk-S-teeth 170 have radially extending edges 188 (the angled teeth edges are denoted 189). Again, this provides the second blade assembly 140 of the second preferred embodiment with a more aggressive ability to cut through dry, hard dirt or soil since the leading edges 212 of the at-least-two-first-disk-bolo-teeth 174 on the blade disks 142, 144 are on the advancing side of the teeth in use. Better breaking ability for reducing or pulverizing the soil is also provided by having the radial edge 188 as the advancing side of the S-tines 170. The combination of S-teeth 70, 70A, 170, 170A and bolo-teeth 72, 74, 172, 174 having the preferred configurations provides for superior digging action in both hard and soft soil.

Referring to FIGS. 23–26 (illustrating the second preferred embodiment of the first blade disk 114 of the first blade assembly) and 31–34 (illustrating the second preferred embodiment of the first blade disk 144 of the second blade assembly), the second preferred embodiment of the first blade disk 114, 144 is shown in detail. It is preferable, but not necessary, that each of the at-least-two-first-disk-S-teeth 70 has a first major surface 184 which faces generally outwardly from the blade assembly and extends: generally radially outwardly from a first circumference 162A, along a first plane 206 containing the first circumference 162A of the first blade disk 114, 144, of the first blade disk 114, 144 a first predetermined distance; then, extends generally outwardly from the blade assembly a second predetermined distance; then, extends generally toward the blade assembly past the first plane 206 by a third predetermined distance; and then, extends in a direction parallel to the first plane 206.

The first predetermined distance is preferably measured generally parallel to the first plane 206. The second and third predetermined distances are preferably measured generally perpendicular to the first plane 206. It is preferable that the first, second and third predetermined distances of the second preferred embodiment are similar to the preferred ranges of the first, second and third predetermined distances set forth in the description of the first preferred embodiment. However, those of ordinary skill in the art will appreciate from this disclosure that the sizing of the individual at-least-two-first-disk-S-teeth 170 can be varied without departing from the scope of the present invention.

Referring to FIGS. 26 and 34, each of the at-least-two-first-disk-bolo-teeth 174 preferably, but not necessarily, has a second major surface 224 which faces generally outwardly from the blade assembly and extends: generally radially outwardly from the first blade disk 114, 144, along the first plane 206, for a fourth predetermined distance; and then, bends through an angle in the range of approximately sixty (60) degrees and approximately ninety-five (95) degrees and extends generally outwardly from the blade assembly. It is preferable, but not necessary that the bend be through an angle of approximately seventy degrees. The preferred ranges for the second preferred embodiment of the fourth predetermined distance are generally the same as the ranges of the fourth predetermined distance of the first preferred embodiment. However, those of ordinary skill in the art will appreciate from this disclosure that the sizing of the individual at-least-two-first-disk-bolo-teeth 74 can be varied without departing from the scope of the present invention.

Each blade disk 112, 114, 142, 144 preferably, but not necessarily, includes four teeth in a predefined configuration to provide superior performance in aggressive mixing and pulverization of hard soil. It is also preferred that the teeth be spaced approximately ninety (90) degrees apart. However, those of ordinary skill in the art will appreciate from this disclosure that that the relative spacing of the individual teeth can be varied without departing from the scope of the present invention. Additionally, those of ordinary skill in the art will appreciate from this disclosure that the number of teeth about each blade disk 12, 14, 42, 44 may be five, six or more teeth without departing from the scope of the present invention.

Figure 19:
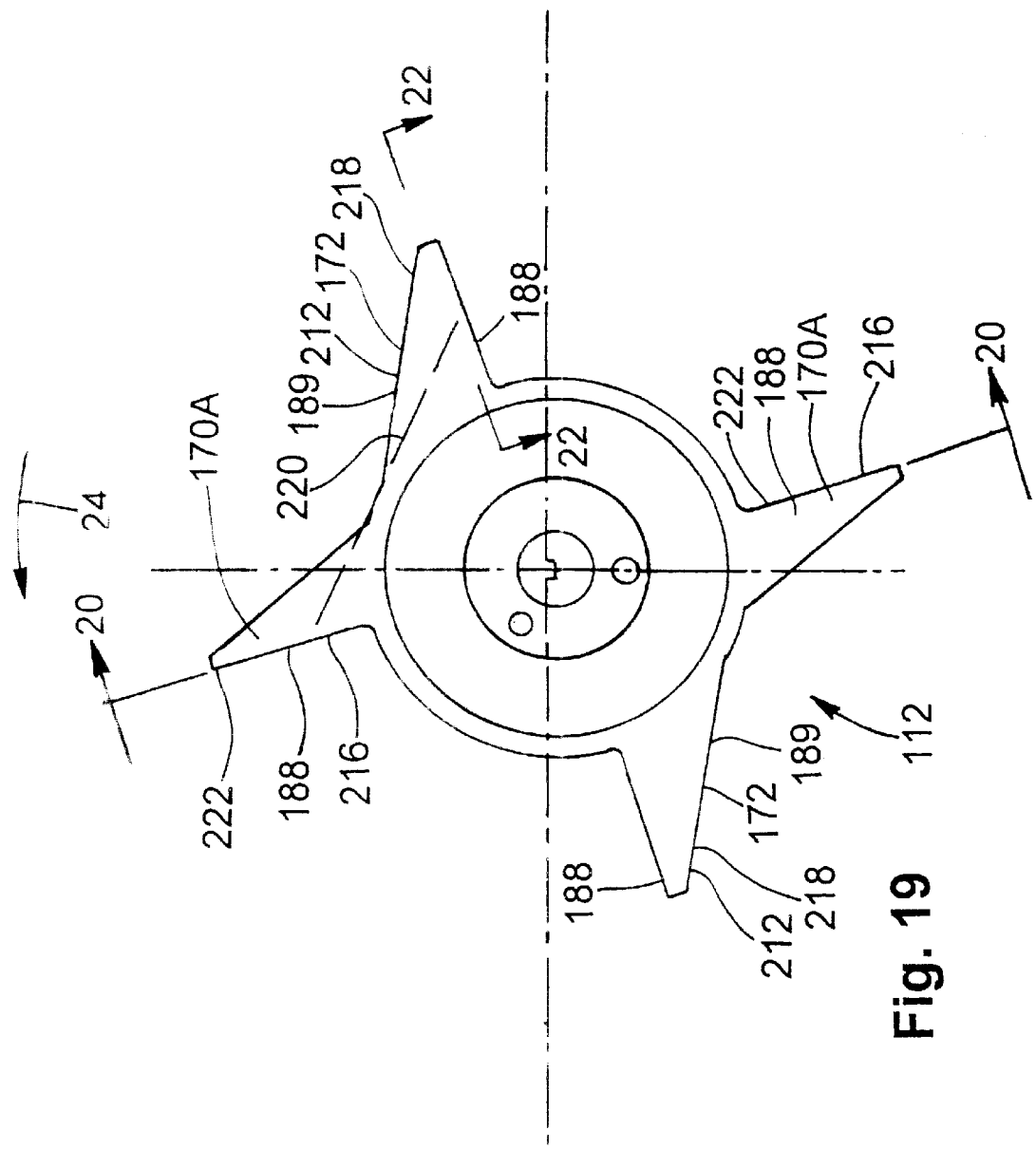
FIG. 19 is a left side elevational view, similar to FIG. 3, of a second preferred embodiment of a second blade disk for a first blade assembly for a tilling mechanism in accordance with the present invention.

Referring to FIGS. 19 and 27, in either of the first or second blade assemblies of the second preferred embodiment, at-least-two-second-disk-bolo-teeth 172 and at-least-two-second-disk-S-teeth 170A are disposed on the second blade disk 112, 142. A third leading edge 218 of each of the at-least-two-second-disk-bolo-teeth 172 extends generally linearly outwardly from the second blade disk 112, 142 in a direction counter to the first direction 24. The third leading edge forming a second obtuse angle as measured relative to a second line 220 extending in the first direction 24 tangent to the second blade disk 112, 142. A fourth leading edge 222 of each of the at-least-two-second-disk-S-teeth 170A extends generally radially outwardly from the second blade disk 112, 142.

As shown in FIGS. 19 and 27, the second blade disk 112, 142 is formed such that the leading edge of each of the at-least-two-second-disk-bolo-teeth 172 has an angled edge 189 and the trailing edge of each of the at-least-two-second-disk-bolo-teeth 172 is the radially extending edge 188. This provides the most effective arrangement for aggressive tilling with the at-least-two-second-disk-bolo-teeth 172 in hard, dry soil. The combination of S-teeth 70, 70A, 170, 170A and bolo-teeth 72, 74, 172, 174 having the preferred configurations provides for superior digging action in both hard and soft soil. With respect to the at-least-two-second-disk-S-teeth 170, the radially extending edge 188 forms the leading edge 222 of each of the at-least-two-second-disk-S-teeth 170.

As shown in FIGS. 20, 21, 28 and 29, each of the at-least-two-second-disk-S-teeth 170A preferably, but not necessarily, has a third major surface 207 which faces generally outwardly from the blade assembly and extends: generally radially outwardly from a second circumference 162B, along a second plane 210 containing the second circumference 162B of the second blade disk 112, 142, of the second blade disk 112, 142 a fifth predetermined distance; then, extends generally outwardly from said blade assembly a sixth predetermined distance; then, extends generally toward the blade assembly past the second plane 210 by a seventh predetermined distance; and then, extends in a direction parallel to the second plane 210.

The general orientation and preferable ranges for the fifth, sixth and seventh predetermined distances are generally similar to that of the fifth, sixth and seventh predetermined distances of the first preferred embodiment, respectively, as described above. However, those of ordinary skill in the art will appreciate from this disclosure that the sizing of the individual at-least-two-second-disk-S-teeth 170A can vary from the preferred ranges without departing from the scope of the present invention.

Referring to FIGS. 22 and 30, it is preferable, but not necessary, that each of the at-least-two-second-disk-bolo-teeth 172 of the second preferred embodiment has a fourth major surface 178 which faces generally outwardly from the blade assembly and extends: generally radially outwardly from the second blade disk 112, 142, along the second plane 210, for an eighth predetermined distance; and then, bends through an angle in the range of approximately sixty (60) degrees and approximately nintey-five (95) degrees and extends towards the first blade disk 114, 144. It is preferable that the angle through which the fourth major surface 178 bends is approximately about seventy degrees. The general orientation and preferred ranges for the eighth predetermined distance of the second preferred embodiment are generally similar to those described for the eighth predetermined distance of the first preferred embodiment.

When assembled to form the first blade assembly, the first and second blade disks 114, 112 are preferably configured such that the angled edges 189 of all of the at-least-two-first-disk-bolo-teeth 174 and the at-least-two-second-disk-bolo-teeth 172, 174 are the leading edges 212, and the trailing edges are the radial edges 188. For the at-least-two-first-disk-S-teeth 170 and the at-least-two-second-disk-S-teeth 170A, the leading edges 216 are the radially extending edges 188 and the trailing edges are the angled edges 189 to provide a right blade assembly having the bolo teeth 172, 174 arranged to provide the most aggressive tilling configuration for cultivating even in hard, dry soil based on the angled edge 189 of the bolo teeth 172, 174 being on the advancing side of the right blade assembly.

Referring now to FIG. 27, the second blade disk 142 of the second blade assembly for the second preferred embodiment of the second blade assembly is shown. Again, the leading edge 218 of the bolo tines 172 in the direction of rotation 24 is the angled edge 189 to provide aggressive tilling in hard, dry soil. Additionally, the advancing edge 216 of the at-least-two-second-disk-S-teeth 170A is the radially extending edge 188 in order to provide for better breaking up of soil into fine particles.

While specific dimensions for the first and second blade disks for the first and second preferred embodiments of the present invention are detailed above and in U.S. Provisional Patent Application No. 60/144,720 which is herein incorporated by reference above, it will recognized by those skilled in the art from the present disclosure that the detailed dimensions only represent one preferred arrangement. Accordingly, the preferred dimensions, the location of the teeth, and the number of the teeth may be varied without departing from the scope of the present invention. However, the present arrangement and the number of tines provides a more aggressive tilling action based on the use of bolo teeth 72, 74, 172, 174 in which at least the leading edge of some of the bolo teeth 72, 74, 172, 174 are angled.

As shown throughout the figures in details 3a, 7a, 11a, 15a, 19a, 23a, 27a, 31a, preferably each of the blade disks 12, 14, 42, 44, 112, 114, 142, 144 includes a central opening for connection to the hubs 18, 48 which is keyed such that the blade disks are properly aligned. While a preferred key arrangement is shown utilizing a radiused bump in connection with the circular opening, it will be recognized by those skilled in the art from the present disclosure that other types of keying arrangements may be utilized, if desired.

In each of the first and second preferred embodiments, the second assembly 40 is positioned on the shaft 22 so that the teeth on the second blade assembly 40 strike the ground before the corresponding teeth on the first blade assembly 10. Alternatively, the blade assemblies 10, 40 can be positioned so that the teeth of the first blade assembly 10 strike the ground prior to the corresponding teeth on the second blade assembly 40. Those of ordinary skill in the art that will appreciate from this disclosure that the first and second blade assemblies can be oriented on the shaft 22 so that the corresponding teeth on both blade assemblies strike the ground at the same time without departing from the scope of the present invention.

It will be appreciated by those skilled in the art that changes can be made to the preferred embodiments described above without departing from the broad inventive concept of the invention. It is understood, therefore, that this invention is not limited to the particular embodiments disclosed, but it is intended to cover modifications within the spirit and scope of the present invention.

We claim:

1. A blade assembly for use with a tilling mechanism, comprising:
   a first blade disk;
   a second blade disk coaxially mounted to rotate with said first blade disk and positioned in a spaced apart generally parallel fashion relative to said first blade disk, said first blade disk and said second blade disk being rotatable in a first rotation direction;
   a first plurality of teeth disposed on said first blade disk, each of said first plurality of teeth having a first leading edge which extends generally radialy outwardly from said first blade disk, said first plurality of teeth comprising at-least-two-first-disk-S-teeth and at-least-two-first-disk-bolo-teeth, said at-least-two-first-disk-S-teeth and said at-least-two-first-disk-bolo-teeth being individually arranged in an alternating fashion about said first blade disk; and a second plurality of teeth disposed on said second blade disk, each of said second plurality of teeth having a second leading edge which extends generally linearly outwardly from said second blade disk in a direction counter to said first rotation direction, said second leading edge forming an obtuse angle as measured relative to a line extending in said first direction tangent to said second blade disk.

2. The blade assembly of claim 1, wherein a first major surface of each of said at-least-two-first-disk-S-teeth, which faces generally outwardly from said blade assembly, extends:

generally radially outwardly from a first circumference, along a first plane containing said first circumference of said first blade disk, of said first blade disk a first predetermined distance; then extends generally outwardly from said blade assembly a second predetermined distance; then extends generally toward said blade assembly past said first plane by a third predetermined distance; and then, extends in a direction parallel to said first plane.

3. The blade assembly of claim 2, wherein a second major surface of each of said at-least-two-first-disk-bolo-teeth, which faces generally outwardly from said blade assembly, extends:

generally radially outwardly from said first blade disk, along said first plane, for a fourth predetermined distance; and then bends through an angle in the range of approximately sixty degrees and approximately ninety-five degrees and extends generally outwardly from said blade assembly.

4. The blade assembly of claim 3, wherein said second plurality of teeth comprise at-least-two-second-disk-S-teeth and at-least-two-second-disk-bolo-teeth, said at-least-two-second-disk-S-teeth and said at-least-two-second-disk-bolo-teeth being individually arranged in an alternating fashion.

5. The blade assembly of claim 4, wherein a third major surface of each of said at-least-two-second-disk-S-teeth, which faces generally outwardly from said blade assembly, extends:

generally radially outwardly from a second circumference, along a second plane containing said second circumference of said second blade disk, of said second blade disk a fifth predetermined distance; then extends generally outwardly from said blade assembly a sixth predetermined distance; then extends generally toward said blade assembly past said second plane by a seventh predetermined distance; and then, extends in a direction parallel to said second plane.

6. The blade assembly of claim 5, wherein a fourth major surface of each of said at-least-two-second-disk-bolo-teeth, which faces generally outwardly from said blade assembly, extends:

generally radially outwardly from said second blade disk, along said second plane, for an eighth predetermined distance; and then bends through an angle in the range of approximately sixty degrees and approximately ninety-five degrees and extends toward said first blade disk.

7. A blade assembly for use with a tilling mechanism, comprising:

a first blade disk;

a second blade disk coaxially mounted to rotate with said first said blade disk and positioned in a spaced apart generally parallel fashion relative to said first blade disk, said first blade disk and said second blade disk being rotatable in a first rotation direction;

at-least-two-first-disk-bolo-teeth and at-least-two-first-disk-S-teeth disposed on said first blade disk, a first leading edge of each of said at-least-two-first-bolo-teeth extends generally linearly outwardly from said first blade disk in a direction counter to said first rotation direction, said first leading edge forming a first obtuse angle as measured relative to a first line extending in said first rotation direction tangent to said first blade disk, a second leading edge of each of said at-least-two-first-disk-S-teeth extends generally radially outwardly from said first blade disk; and at-least-two-second-disk-bolo-teeth and at-least-two-second-disk-S-teeth disposed on said second blade disk, a third leading edge of each of said at-least-two-second-disk-bolo-teeth extends generally linearly outwardly from said second blade disk in a direction counter to said first rotation direction, said third leading edge forming a second obtuse angle as measured relative to a second line extending in said first direction tangent to said second blade disk, a fourth leading edge of each of said at-least-second-disk-S-teeth extends generally radially outwardly from said second blade disk.

8. The blade assembly of claim 7, wherein a first major surface of each of said at-least-two-first-disk-S-teeth, which faces generally outwardly from said blade assembly, extends:

generally radially outwardly from a first circumference, along a first plane containing said first circumference of said first blade disk, of said first blade disk a first predetermined distance; then extends generally outwardly from said blade assembly a second predetermined distance; then extends generally toward said blade assembly past said first plane by a third predetermined distance; and then, extends in a direction parallel to said first plane.

9. The blade assembly of claim 8, wherein a second major surface of each of said at-least-two-first-disk-bolo-teeth, which faces generally outwardly from said blade assembly, extends:

generally radially outwardly from said first blade disk, along said first plane, for a fourth predetermined distance; and then bends through an angle in the range of approximately sixty degrees and approximately ninety-five degrees and extends generally outwardly from said blade assembly.

10. The blade assembly of claim 9, wherein a third major surface of each of said at-least-two-second-disk-S-teeth, which faces generally outwardly from said blade assembly, extends:

generally radially outwardly from a second circumference, along a second plane containing said second circumference of said second blade disk, of said second blade disk a fifth predetermined distance; then extends generally outwardly from said blade assembly a sixth predetermined distance; then extends generally toward said blade assembly past said first plane by a seventh predetermined distance; and then, extends in a direction parallel to said second plane.

11. The blade assembly of claim 10, wherein a fourth major surface of each of said at-least-two-second-disk-bolo- teeth, which faces generally outwardly from said blade assembly, extends:

generally radially outwardly from said second blade disk, along said second plane, for an eighth predetermined distance; and then bends through an angle in the range of between approximately sixty degrees and approximately ninety-five degrees and extends toward said first blade disk.

* * * * *